(12) United States Patent
Tanaka et al.

(10) Patent No.: US 9,778,806 B2
(45) Date of Patent: Oct. 3, 2017

(54) ELECTRONIC DEVICE AND METHOD OF CONTROLLING THE SAME FOR DETECTING A CONDUCTIVE OBJECT ON A TOUCH-PANEL

(71) Applicant: CANON KABUSHIKI KAISHA, Tokyo (JP)

(72) Inventors: Tomoaki Tanaka, Tokyo (JP); Kunihisa Nakao, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 14/927,197

(22) Filed: Oct. 29, 2015

(65) Prior Publication Data

US 2016/0132152 A1 May 12, 2016

(30) Foreign Application Priority Data

Nov. 10, 2014 (JP) .................. 2014-228317

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ..................................................... G06F 3/044
See application file for complete search history.

(56) References Cited

U.S. PATENT DOCUMENTS

| 8,816,986 B1* | 8/2014 | Park | G06F 3/044 345/173 |
| 2008/0117181 A1* | 5/2008 | Park | G06F 3/0412 345/173 |
| 2009/0096762 A1 | 4/2009 | Hinata | |
| 2013/0100071 A1* | 4/2013 | Wright | G06F 3/044 345/174 |
| 2014/0152621 A1* | 6/2014 | Okayama | G06F 3/0416 345/174 |

FOREIGN PATENT DOCUMENTS

JP 2009-116849 A 5/2009

* cited by examiner

*Primary Examiner* — Sanghyuk Park
(74) *Attorney, Agent, or Firm* — Fitzpatrick, Cella, Harper & Scinto

(57) ABSTRACT

Provided is a touch detection device, including: a determining unit configured to determine a region of a conductive object based on measurement of a self-capacitance of each of a plurality of electrodes arranged to intersect with each other; and a detecting unit configured to detect the conductive object based on measurement of a mutual capacitance of, among the plurality of electrodes, an electrode corresponding to the region of the conductive object determined by the determining unit, without measuring a mutual capacitance of an electrode outside of the region of the conductive object determined by the determining unit.

11 Claims, 14 Drawing Sheets

FIG. 14A

THE FIRST TOUCH
DETERMINATION REGION
(X2, X3, X4, X5, Y8, Y9, Y10, Y11)

|    | Y1  | Y2  | Y3  | Y4  | Y5  | Y6  | Y7  | Y8  | Y9  | Y10 | Y11 |
|----|-----|-----|-----|-----|-----|-----|-----|-----|-----|-----|-----|
| X1 | OFF | OFF | OFF | OFF | OFF | OFF | OFF | OFF | OFF | OFF | OFF |
| X2 | OFF | OFF | OFF | OFF | OFF | OFF | OFF | ON  | ON  | ON  | ON  |
| X3 | OFF | OFF | OFF | OFF | OFF | OFF | OFF | ON  | ON  | ON  | ON  |
| X4 | ON  | ON  | ON  | ON  | ON  | OFF | OFF | ON  | ON  | ON  | ON  |
| X5 | ON  | ON  | ON  | ON  | ON  | OFF | OFF | OFF | OFF | ON  | ON  |
| X6 | ON  | ON  | ON  | ON  | ON  | OFF | OFF | OFF | OFF | OFF | OFF |
| X7 | ON  | ON  | ON  | ON  | ON  | OFF | OFF | OFF | OFF | OFF | OFF |

THE SECOND TOUCH
DETERMINATION REGION
(X4, X5, X6, X7, Y1, Y2, Y3)

CONDUCTIVE-OBJECT MOVEMENT
DETERMINATION REGION
(X4, X5, X6, X7, Y1, Y2, Y3, Y4, Y5)

FIG. 14B

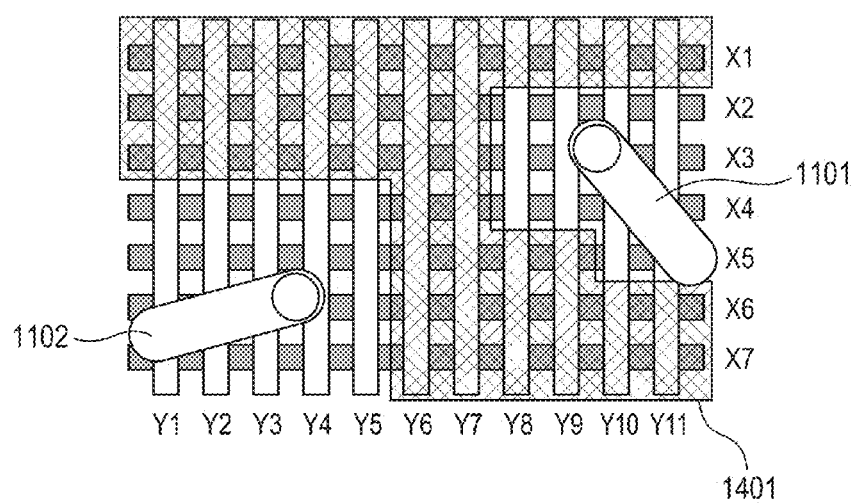

ELECTRONIC DEVICE AND METHOD OF CONTROLLING THE SAME FOR DETECTING A CONDUCTIVE OBJECT ON A TOUCH-PANEL

BACKGROUND OF THE INVENTION

Field of the Invention

The present invention relates to an electronic device and a method of controlling the same.

Description of the Related Art

As electronic devices, touch detection devices such as touch panels are known. The touch detection device can be operated intuitively, and is thus mounted on smart phones, digital video cameras, digital still cameras, and other apparatus. In the touch detection device, a capacitive system is often employed as a detection system.

The capacitive system refers to a system of carrying out touch detection by arranging a plurality of electrodes arrayed in columns and a plurality of electrodes arrayed in rows on a touch panel surface so as to intersect with each other, and measuring a capacitance generated between the electrodes. Further, the capacitive system includes touch detection through measurement of a mutual capacitance and touch detection through measurement of a self-capacitance.

The measurement of the mutual capacitance refers to the following method. A drive pulse is applied to one of the electrodes arranged to intersect with each other, and a current change amount of the other electrode when a conductive object such as a finger is brought into contact is measured as a capacitance change amount, to thereby detect the touch. In the measurement of the mutual capacitance, the capacitance change amount per electrode when the capacitance change amount is measured is minute. Therefore, in general, the touch is detected based on the capacitance change amount obtained by integration of a predetermined number of times.

The measurement of the self-capacitance refers to the following method. One of the electrodes arranged to intersect with each other is fixed to have a predetermined potential, and a drive pulse is applied to the other electrode. A current change amount of the electrode on the drive pulse application side when a conductive object such as a finger is brought into contact is measured as a capacitance change amount, to thereby detect the touch.

In the measurement of the mutual capacitance, the capacitance change value at an intersection where the electrodes intersect with each other is measured. In the measurement of the self-capacitance, the paired capacitance change values of the one electrode and the other electrode are measured. Therefore, the touch detection through the measurement of the self-capacitance has a feature of increase in detection sensitivity, and the touch detection through the measurement of the mutual capacitance has a feature of increase in detection position accuracy.

However, in any measurement method, the capacitance change is measured based on the current integration amount obtained when the drive pulse is applied to each electrode, and the charges obtained through current integration are reset for each scan, which causes a problem in that useless power is consumed. In particular, the number of electrodes has been increased due to increase in size of the touch panel, and hence power consumption is further increased.

To address such a problem, in Japanese Patent Application Laid-Open No. 2009-116849, there is disclosed an input device in which a resistive input portion is set to a stand-by state of not carrying out input detection until contact to a capacitive input portion is detected, and is shifted to an operating state of carrying out input detection in response to the contact to the capacitive input portion.

However, the input device of Japanese Patent Application Laid-Open No. 2009-116849 requires electrode structures of the resistive input portion and the capacitive input portion, which leads to a complex structure to increase the cost. Further, the transmittance of the touch panel is reduced.

SUMMARY OF THE INVENTION

According to one embodiment of the present invention, there is provided an electronic device, including: a determining unit configured to determine a region of a conductive object based on measurement of a self-capacitance of each of a plurality of electrodes arranged to intersect with each other; and a detecting unit configured to detect the conductive object based on measurement of a mutual capacitance of, among the plurality of electrodes, an electrode corresponding to the region of the conductive object determined by the determining unit, without measuring a mutual capacitance of an electrode outside of the region of the conductive object determined by the determining unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14A and FIG. 14B are diagrams for illustrating electrodes whose capacitance change amounts are acquired by the mutual capacitance measurement in the second frame according to the fourth embodiment.

DESCRIPTION OF THE EMBODIMENTS

Now, a touch detection device 100 serving as an electronic device according to an exemplary embodiment of the present invention is described with reference to the drawings.

Figure 1:
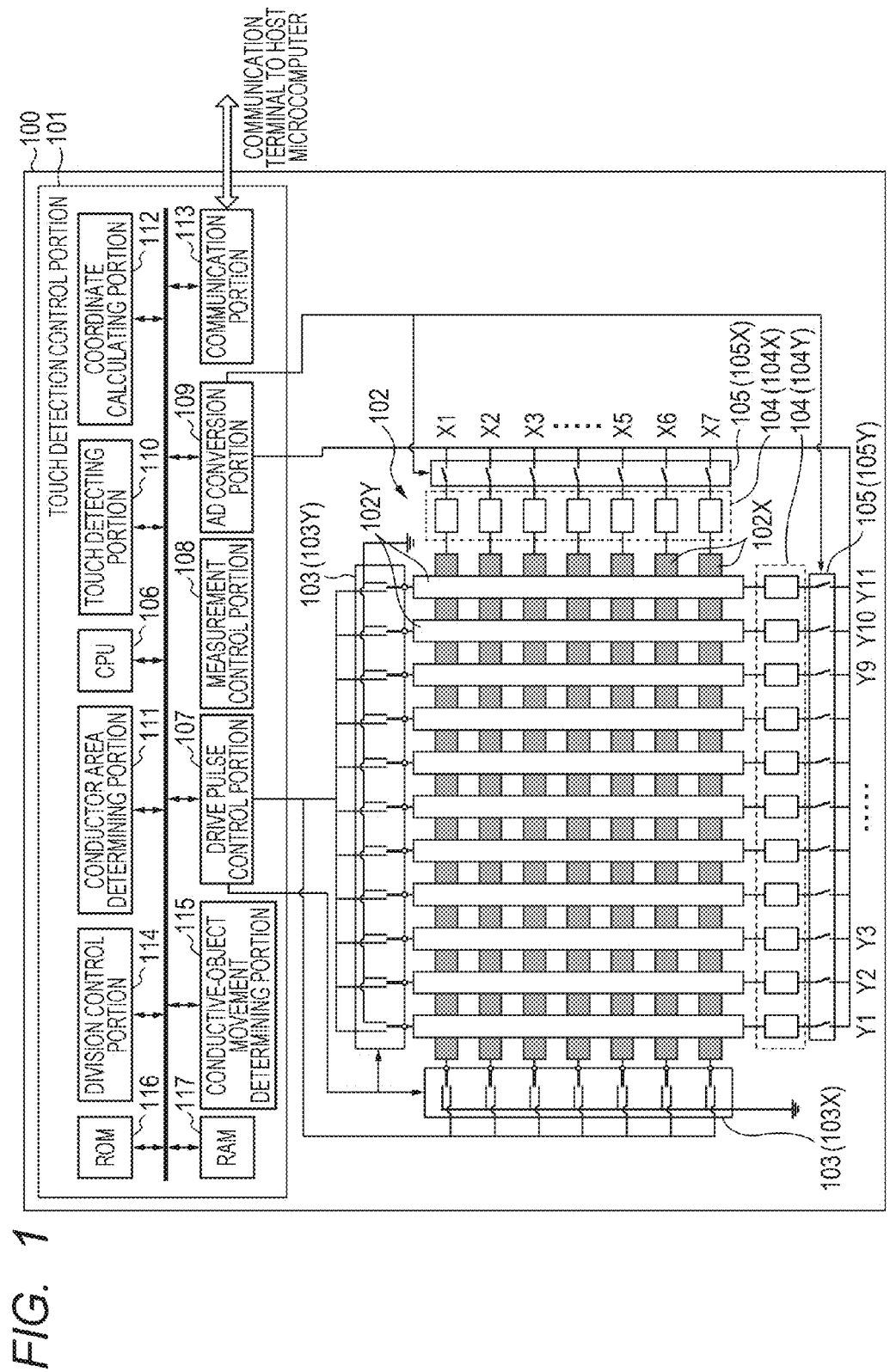
FIG. 1 is a block diagram for illustrating a configuration of a touch detection device.

First, the configuration of the touch detection device 100 common in respective embodiments is described with reference to FIG. 1. FIG. 1 is a block diagram for illustrating the configuration of the entire touch detection device 100.

The touch detection device 100 includes a touch detection control portion 101, an electrode portion 102, a drive pulse applying portion 103, a capacitance measuring portion 104, and an AD conversion selector portion 105.

The touch detection control portion 101 includes a CPU 106, a drive pulse control portion 107, a measurement control portion 108, an AD conversion portion 109, a touch detecting portion 110, a conductor area determining portion 111, a coordinate calculating portion 112, and a communication portion 113. Further, the touch detection control portion 101 includes a division control portion 114, a conductive-object movement determining portion 115, a ROM 116, and a RAM 117.

The CPU 106 is a central processing unit configured to control the entire touch detection device 100. The CPU 106 executes a program stored in the ROM 116, to thereby control each piece of hardware of the touch detection control portion 101 to realize processing of a flow chart described later.

The drive pulse control portion 107 generates a drive pulse used for applying, to the electrode portion 102, a voltage or a current for measuring the capacitance, and a timing signal used for applying the drive pulse to each electrode. The drive pulse control portion 107 applies, via the drive pulse applying portion 103, the drive pulse to all electrodes based on the generated timing signal.

The drive pulse applying portion 103 is an ON/OFF circuit configured to apply the drive pulse individually to all of the electrodes one by one. Specifically, the drive pulse applying portion 103 carries out switch control of applying the drive pulse to all of the electrodes based on the timing signal generated by the drive pulse control portion 107. The drive pulse applying portion 103 corresponds to an example of an applying unit.

In this case, the electrode portion 102 includes a plurality of electrodes arranged to intersect with each other. The electrode portion 102 of this embodiment includes a plurality of row electrodes 102X arrayed in one direction, and a plurality of column electrodes 102Y arrayed in a direction intersecting with the one direction. FIG. 1 is an example in which seven row electrodes 102X (electrode X1 to electrode X7) and eleven column electrodes 102Y (electrode Y1 to electrode Y11) are orthogonal to each other.

The capacitance measuring portion 104 is a circuit for measuring the capacitance. The capacitance measuring portion 104 accumulates, as a charge amount, a capacitance generated between an electrode to which the drive pulse is applied by the voltage or the current generated by the drive pulse control portion 107 and an electrode opposed thereto, and converts the capacitance into a voltage. The capacitance measuring portion 104 can measure the capacitances of all of the electrodes based on a drive timing. The capacitance measuring portion 104 includes an accumulating circuit serving as an accumulating unit configured to accumulate a capacitance for each electrode.

The measurement control portion 108 is a circuit for controlling ON/OFF of each accumulating circuit of the capacitance measuring portion 104. The measurement control portion 108 turns off the accumulating circuit of the capacitance measuring portion 104 corresponding to an electrode that does not require measurement for each drive timing, to thereby reduce power consumption.

The AD conversion portion 109 converts, via the AD conversion selector portion 105, the voltage accumulated in the capacitance measuring portion 104 into a digital numerical value for each electrode. The AD conversion portion 109 calculates the capacitance change amount for each electrode based on the converted numerical value, and stores the calculated capacitance change amount in the RAM 117 or the like in association with each electrode.

In this embodiment, the drive pulse applying portion 103, the capacitance measuring portion 104, and the AD conversion selector portion 105 are formed for each row electrode 102X and each column electrode 102Y. Specifically, the drive pulse applying portion 103 includes a drive pulse applying portion 103X corresponding to the row electrodes 102X, and a drive pulse applying portion 103Y corresponding to the column electrodes 102Y. The capacitance measuring portion 104 includes a capacitance measuring portion 104X corresponding to the row electrodes 102X, and a capacitance measuring portion 104Y corresponding to the column electrodes 102Y. The AD conversion selector portion 105 includes an AD conversion selector portion 105X corresponding to the row electrodes 102X, and an AD conversion selector portion 105Y corresponding to the column electrodes 102Y.

The touch detecting portion 110 determines whether or not the touch is detected by comparing the capacitance change amount with a predetermined touch detection threshold for each electrode. The touch detecting portion 110 corresponds to an example of a detecting unit.

The conductor area determining portion 111 determines a region where a conductive object is present by comparing each capacitance change amount, which is measured with use of the row electrode 102X and the column electrode 102Y, with a predetermined conductor determination threshold. The conductor area determining portion 111 corresponds to an example of a determining unit.

The coordinate calculating portion 112 calculates coordinates of the touch detection by calculating, for example, a center of gravity based on the capacitance change amount at the electrode where the touch detection of the conductive object is determined by the touch detecting portion 110 and based on the capacitance change amount at the periphery thereof. Note that, the coordinate calculating portion 112 calculates the center of gravity individually for each axis when the arrangement of the electrode portion 102 is two dimensional or more. The coordinate calculating portion 112 corresponds to an example of the detecting unit.

The communication portion 113 is a communication circuit for communicating whether or not the touch is detected by the touch detecting portion 110 and the coordinate value of the touch detection calculated by the coordinate calculating portion 112 to a host microcomputer. In general, the communication portion 113 includes a serial communication circuit such as an I2C and an SPI.

The division control portion 114 controls the drive pulse control portion 107 and the measurement control portion 108 so as to measure the self-capacitance or the mutual capacitance with use of electrodes culled from all of the electrodes. Further, the division control portion 114 divides all of the electrodes into a plurality of groups. The division control portion 114 corresponds to an example of a dividing unit.

The conductive-object movement determining portion 115 is a circuit configured to calculate a difference amount between the capacitance change amount acquired in the previous frame and the capacitance change amount acquired in the current frame, to thereby determine the region to which the conductive object is moved based on the difference amount. The conductive-object movement determining portion 115 corresponds to an example of a movement determining unit.

The ROM 116 is a non-volatile memory, and stores a program to be executed by the CPU 106.

The RAM 117 is a volatile memory, and temporarily stores a program read out from the ROM 116 by the CPU 106, or temporarily stores data calculated by the CPU 106 or the like.

Next, measurement of a self-capacitance (hereinafter referred to as "self-capacitance measurement") and measurement of a mutual capacitance (hereinafter referred to as "mutual capacitance measurement") carried out by the touch detection device 100 are described with reference to FIG. 2A, FIG. 2B, and FIG. 3.

First, the operation of the self-capacitance measurement is described.

Figure 2A:
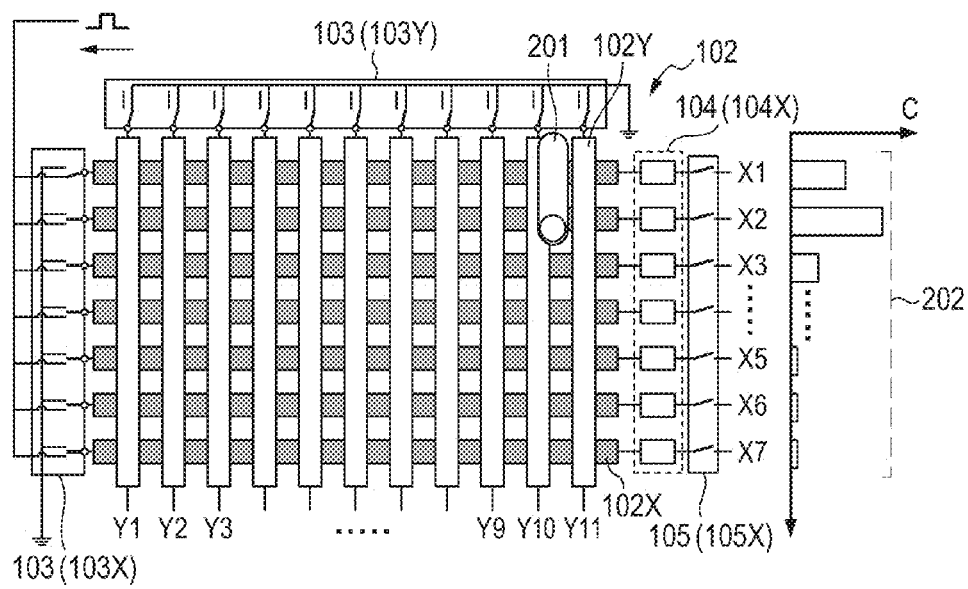
FIG. 2A and FIG. 2B are diagrams for illustrating an operation of self-capacitance measurement.

FIG. 2A is a diagram for illustrating the self-capacitance measurement in the row electrodes 102X.

In the self-capacitance measurement, the electrode to which the drive pulse is applied and the electrode whose capacitance is measured are the same. In this case, the drive pulse is applied to the row electrode 102X, and the capacitance of the row electrode 102X is measured. Therefore, one-dimensional touch detection in the row direction is enabled.

Specifically, the drive pulse applying portion 103Y applies a certain voltage (corresponding to 0 V in this case) to the column electrodes 102Y (electrode Y1 to electrode Y11), and the drive pulse applying portion 103X sequentially scans the row electrodes 102X (electrode X1 to electrode X7). A capacitance is generated between the row electrode 102X and the column electrode 102Y to which the certain voltage is applied, and hence the capacitance measuring portion 104X accumulates respective capacitances of the electrodes X1 to X7.

The AD conversion portion 109 sequentially quantifies the accumulated capacitances via the AD conversion selector portion 105X for the respective electrodes X1 to X7, to thereby calculate the capacitance change amounts of the row electrodes 102X. In the example of FIG. 2A, a conductive object 201 such as a finger is present so as to be opposed to the electrode portion 102. The capacitance value is increased in the row electrode 102X opposed to the conductive object 201. Therefore, as shown in a graph of a capacitance change amount 202 of FIG. 2A, the calculated capacitance change amounts are large in the electrodes X1 to X3 at which the conductive object 201 is present. In this case, the capacitance change amount refers to a difference in capacitance from a state in which the conductive object is absent.

Figure 2B:
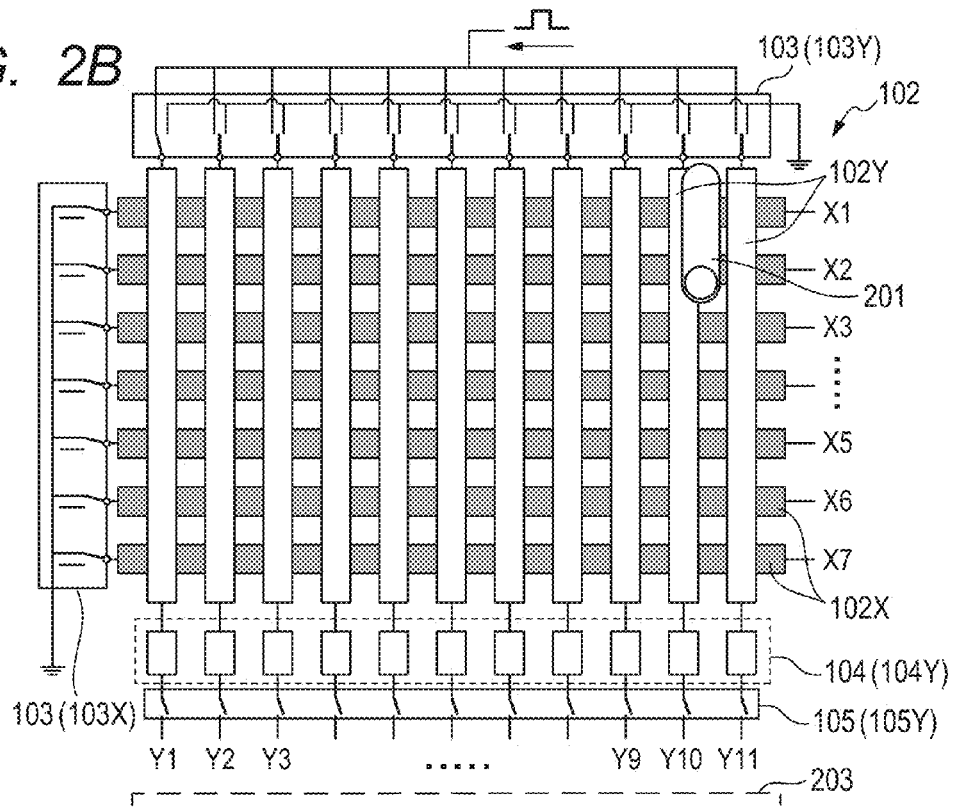
Figure 2B:

FIG. 2B is a diagram for illustrating the self-capacitance measurement in the column electrodes 102Y.

In this case, the drive pulse is applied to the column electrode 102Y, and the capacitance of the column electrode 102Y is measured. Therefore, one-dimensional touch detection in the column direction is enabled.

Specifically, the drive pulse applying portion 103X applies a certain voltage (corresponding to 0 V in this case) to the row electrodes 102X (electrode X1 to electrode X7), and the drive pulse applying portion 103Y sequentially scans the column electrodes 102Y (electrode Y1 to electrode Y11). A capacitance is generated between the column electrode 102Y and the row electrode 102X to which the certain voltage is applied, and hence the capacitance measuring portion 104Y accumulates respective capacitances of the electrodes Y1 to Y11.

The AD conversion portion 109 sequentially quantifies the accumulated capacitances via the AD conversion selector portion 105Y for the respective electrodes Y1 to Y11, to thereby calculate the capacitance change amounts of the column electrodes 102Y. In the example of FIG. 2B, a conductive object 201 such as a finger is present so as to be opposed to the electrode portion 102. The capacitance value is increased in the column electrode 102Y opposed to the conductive object 201. Therefore, as shown in a graph of a capacitance change amount 203 of FIG. 2B, the calculated capacitance change amounts 203 are large in the electrodes Y9 to Y11 at which the conductive object 201 is present.

Next, the operation of the mutual capacitance measurement is described.

Figure 3:
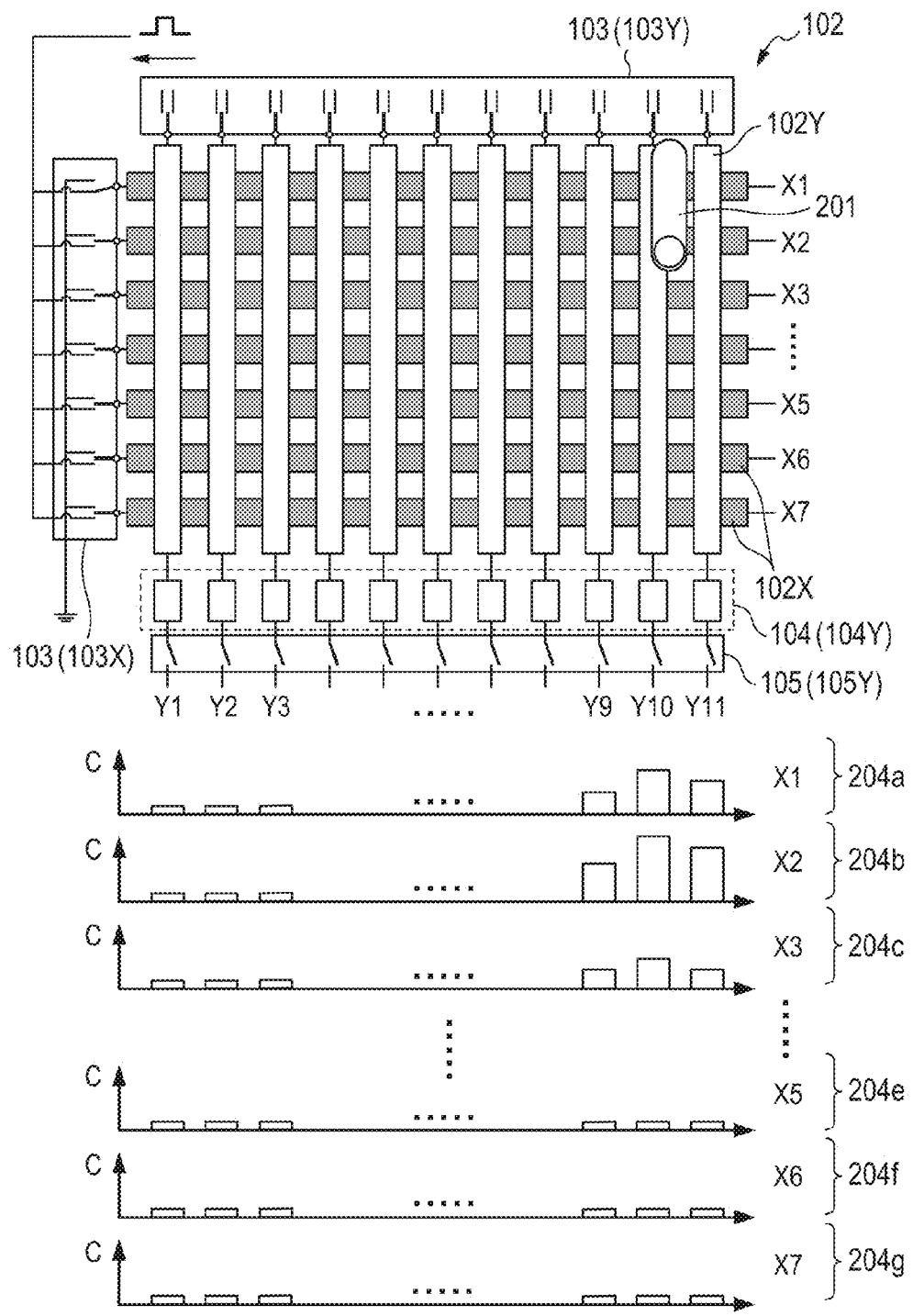
FIG. 3 is a diagram for illustrating an operation of mutual capacitance measurement.

FIG. 3 is a diagram for illustrating the mutual capacitance measurement, and is an example in which the row electrode 102X is set as an electrode to which the drive pulse is applied and the column electrode 102Y is set as an electrode whose capacitance is measured.

In this case, the drive pulse applying portion 103X sequentially scans the row electrodes 102X (electrode X1 to electrode X7). First, when the drive pulse applying portion 103X applies the drive pulse to the electrode X1 among the row electrodes 102X, a capacitance is generated between the electrode X1 and each of the column electrodes 102Y orthogonal to the electrode X1 (electrode Y1 to electrode Y11). Therefore, the capacitance measuring portion 104Y accumulates the capacitances of the electrodes Y1 to Y11 obtained during the drive of the electrode X1.

The AD conversion portion 109 sequentially quantifies the accumulated capacitances via the AD conversion selector portion 105Y for the respective electrodes Y1 to Y11, to thereby calculate the capacitance change amounts. In the example of FIG. 3, the calculated capacitance change amounts are shown in a graph of a capacitance change amount 204a.

Next, when the drive pulse applying portion 103X applies the drive pulse to the electrode X2 among the row electrodes 102X, a capacitance is generated between the electrode X2 and each of the column electrodes 102Y orthogonal to the electrode X2 (electrode Y1 to electrode Y11). Therefore, the capacitance measuring portion 104Y accumulates the capacitances of the electrodes Y1 to Y11 obtained during the drive of the electrode X2.

The AD conversion portion 109 sequentially quantifies the accumulated capacitances via the AD conversion selector portion 105Y for the respective electrodes Y1 to Y11, to thereby calculate the capacitance change amounts. In the example of FIG. 3, the calculated capacitance change amounts are shown in a graph of a capacitance change amount 204b.

Similarly, the drive pulse applying portion 103X sequentially applies the drive pulse to the electrodes X3 to X7 among the row electrodes 102X, and then the AD conversion selector portion 105Y sequentially quantifies the accumulated capacitances for the respective electrodes Y1 to Y11, to thereby calculate the capacitance change amounts. In the example of FIG. 3, the calculated capacitance change amounts are shown in graphs of capacitance change amounts 204c to 204g.

In the mutual capacitance measurement, the capacitance change amount is increased at the electrode at which the conductive object 201 such as a finger is present because a current flow to the conductive object 201 occurs relative to the capacitance between the row electrode 102X and the column electrode 102Y. Therefore, presence of the conductive object 201, that is, the touch can be detected at a position where the capacitance change amount is large.

As described above, in the mutual capacitance measurement, through scanning from the electrode X1 to the electrode X7, the capacitance change amounts of the entire electrode portion 102 can be calculated, thereby being capable of carrying out two-dimensional touch detection.

Now, embodiments of the present invention in which the touch detection device 100 carries out touch detection are described with reference to the drawings.

First Embodiment

In this embodiment, the conductor area determining portion 111 determines the region of the conductive object based on the self-capacitance measurement, and the touch detecting portion 110 detects the conductive object based on the mutual capacitance measurement of only electrodes corresponding to the determined region of the conductive object, to thereby reduce the power consumption.

Figure 4A:
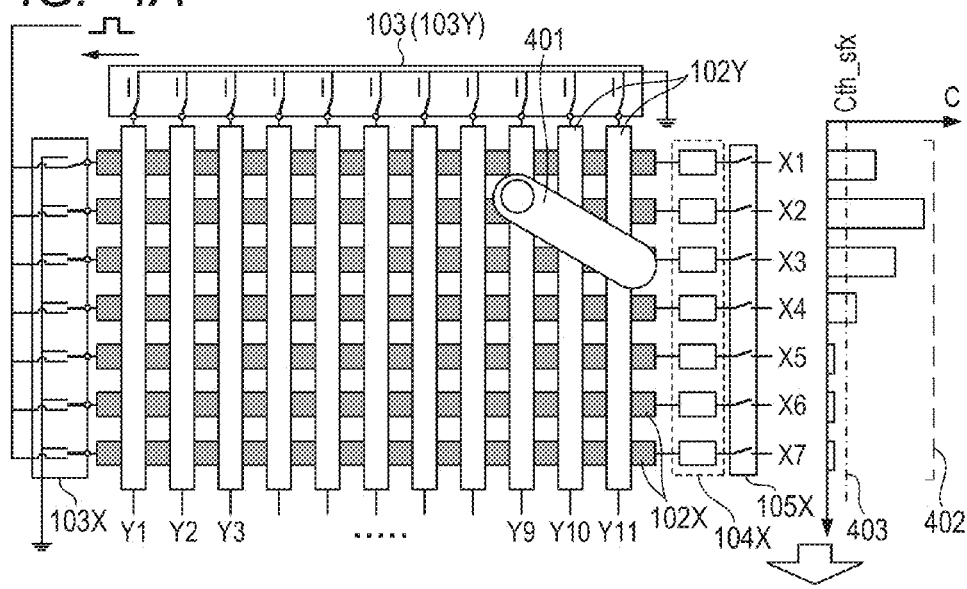
FIG. 4A and FIG. 4B are diagrams for illustrating processing of self-capacitance measurement according to a first embodiment of the present invention.
Figure 4B:
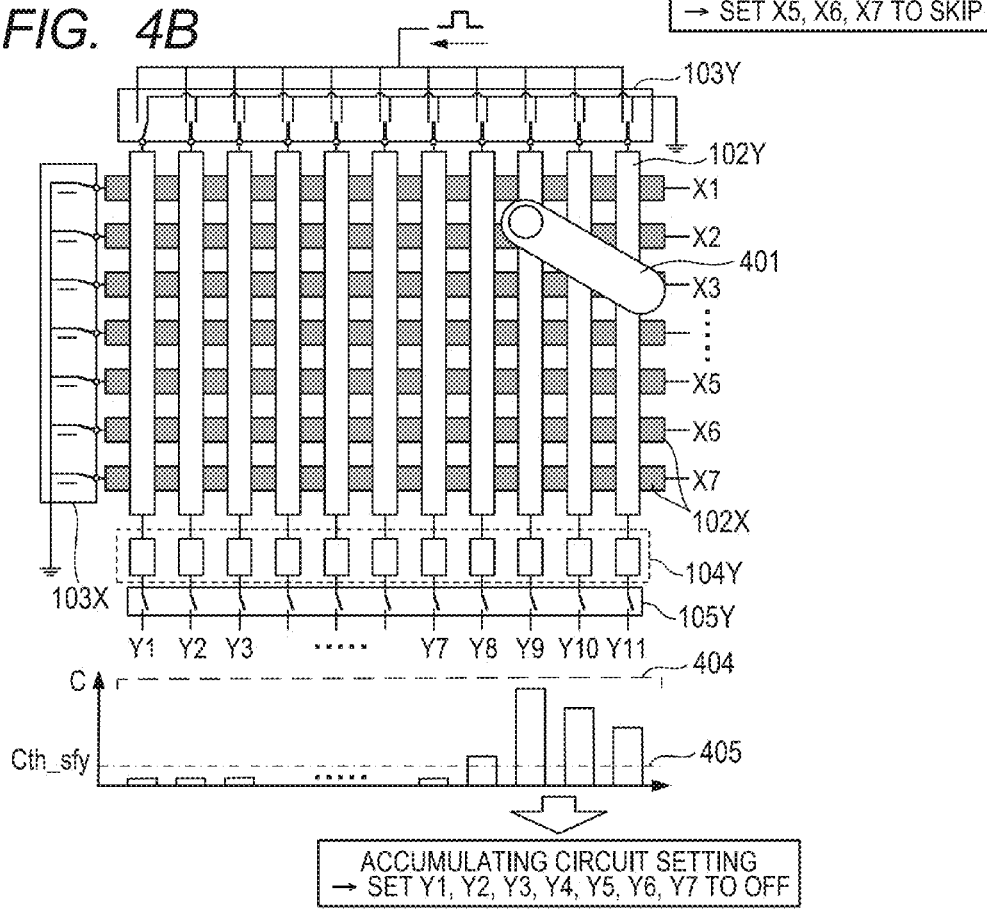

FIG. 4A and FIG. 4B are diagrams for illustrating processing of determining the region of the conductive object through the self-capacitance measurement.

FIG. 4A is a diagram for illustrating a state of carrying out the self-capacitance measurement for each row electrode 102X (electrode X1 to electrode X7). The AD conversion portion 109 calculates the capacitance change amount based on the accumulated capacitance for each of the electrodes X1 to X7. In the example of FIG. 4A, calculated capacitance change amounts 402 are shown in a graph. In this case, a conductive object 401 is present at the electrodes X1 to X4 among the row electrodes 102X, and hence the capacitance change amounts of the electrodes X1 to X4 are increased.

The conductor area determining portion 111 compares the calculated capacitance change amount with an X-line conductor determination threshold for determining the region of the conductive object with respect to the row electrode 102X. The X-line conductor determination threshold is stored in the conductor area determining portion 111 itself or in the ROM 116, and is represented by a dashed-dotted line 403 (Cth_sfx) of the graph of FIG. 4A. The conductor area determining portion 111 determines in the current frame that the conductive object 401 is present at the electrodes X1 to X4 having capacitance change amounts that are equal to or more than the X-line conductor determination threshold. On the other hand, the conductor area determining portion 111 determines in the current frame that the conductive object 401 is absent at the electrodes X5 to X7 having capacitance change amounts that are less than the X-line conductor determination threshold.

Regarding the electrodes X5 to X7 at which the absence of the conductive object is determined, the conductor area determining portion 111 sets to skip application of the drive pulse via the drive pulse control portion 107 so as to prevent application of the drive pulse in the mutual capacitance measurement described later. Specifically, the conductor area determining portion 111 notifies the drive pulse control portion 107 of information on the electrodes X5 to X7 at which the absence of the conductive object is determined. In the mutual capacitance measurement, the drive pulse control portion 107 carries out control to prevent application of the drive pulse via the drive pulse applying portion 103X to the notified electrodes X5 to X7.

FIG. 4B is a diagram for illustrating a state of carrying out the self-capacitance measurement for each column electrode 102Y (electrode Y1 to electrode Y11). The AD conversion portion 109 calculates the capacitance change amount based on the accumulated capacitance for each of the electrodes Y1 to Y11. In the example of FIG. 4B, calculated capacitance change amounts 404 are shown in a graph. In this case, a conductive object 401 is present at the electrodes Y8 to Y11 among the column electrodes 102Y, and hence the capacitance change amounts of the electrodes Y8 to Y11 are increased.

The conductor area determining portion 111 compares the calculated capacitance change amount with a Y-line conductor determination threshold for determining the region of the conductive object with respect to the column electrode 102Y. The Y-line conductor determination threshold is stored in the conductor area determining portion 111 itself or in the ROM 116, and is represented by a dashed-dotted line 405 (Cth_sfy) of the graph of FIG. 4B. The conductor area determining portion 111 determines in the current frame that the conductive object 401 is present at the electrodes Y8 to Y11 having capacitance change amounts that are equal to or more than the Y-line conductor determination threshold. On the other hand, the conductor area determining portion 111 determines in the current frame that the conductive object 401 is absent at the electrodes Y1 to Y7 having capacitance change amounts that are less than the Y-line conductor determination threshold.

Regarding the electrodes Y1 to Y7 at which the absence of the conductive object is determined, the conductor area determining portion 111 sets the accumulating circuits of the capacitance measuring portion 104Y to OFF via the measurement control portion 108 so as to prevent capacitance measurement in the mutual capacitance measurement described later. Specifically, the conductor area determining portion 111 notifies the measurement control portion 108 of the information on the electrodes Y1 to Y7 at which the absence of the conductive object is determined. In the mutual capacitance measurement, the measurement control portion 108 sets the accumulating circuits of the capacitance measuring portion 104Y corresponding to the notified electrodes Y1 to Y7 to OFF, to thereby carry out control to prevent capacitance measurement.

Figure 5:
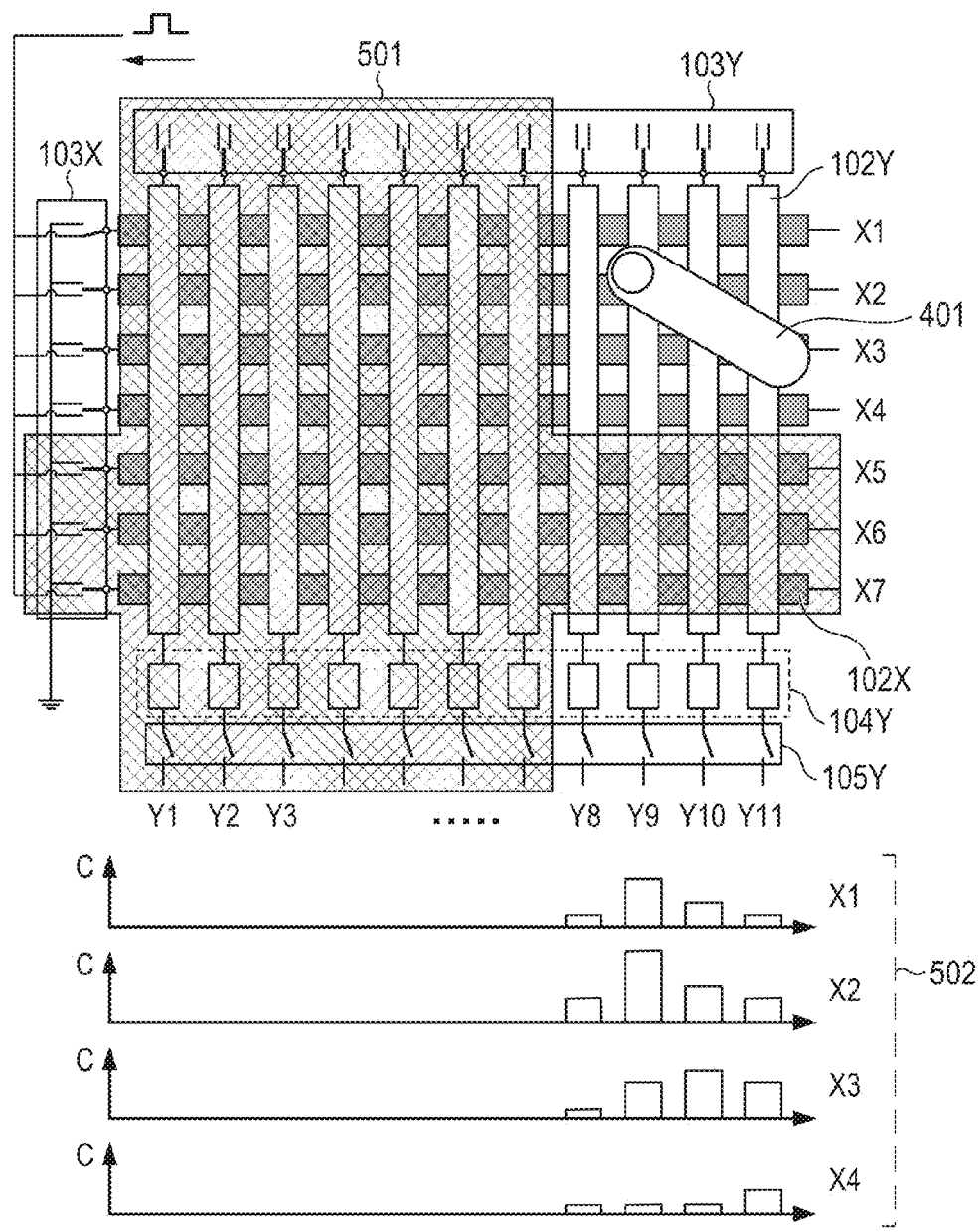
FIG. 5 is a diagram for illustrating processing of mutual capacitance measurement according to the first embodiment.

FIG. 5 is a diagram for illustrating processing of the mutual capacitance measurement.

In the above-mentioned self-capacitance measurement, the conductor area determining portion 111 determines that the conductive object 401 is present in a region corresponding to the electrodes X1 to X4 among the row electrodes 102X and the electrodes Y8 to Y11 among the column electrodes 102Y.

In the mutual capacitance measurement, as described above, the drive pulse control portion 107 controls the drive pulse applying portion 103X to skip the application of the drive pulse to the electrodes X5 to X7 at which the absence of the conductive object is determined. Further, the measurement control portion 108 sets the accumulating circuits of the capacitance measuring portion 104Y, which correspond to the electrodes Y1 to Y7 at which the absence of the conductive object is determined, to OFF. Therefore, in the mutual capacitance measurement, the capacitance measuring portion 104Y calculates the capacitances of only the electrodes X1 to X4 among the row electrodes 102X and the electrodes Y8 to Y11 among the column electrodes 102Y excluding a cross-hatched portion 501 illustrated in FIG. 5. In FIG. 5, capacitance change amounts 502 of the electrodes Y8 to Y11 when the drive pulse is applied to the respective electrodes X1 to X4 are shown in graphs.

As described above, in the self-capacitance measurement, the region of the conductive object is determined, and in the mutual capacitance measurement, the drive pulse is not applied to the electrodes at which the conductive object is absent to prevent capacitance measurement. In this manner, power consumption can be reduced.

Figure 6:
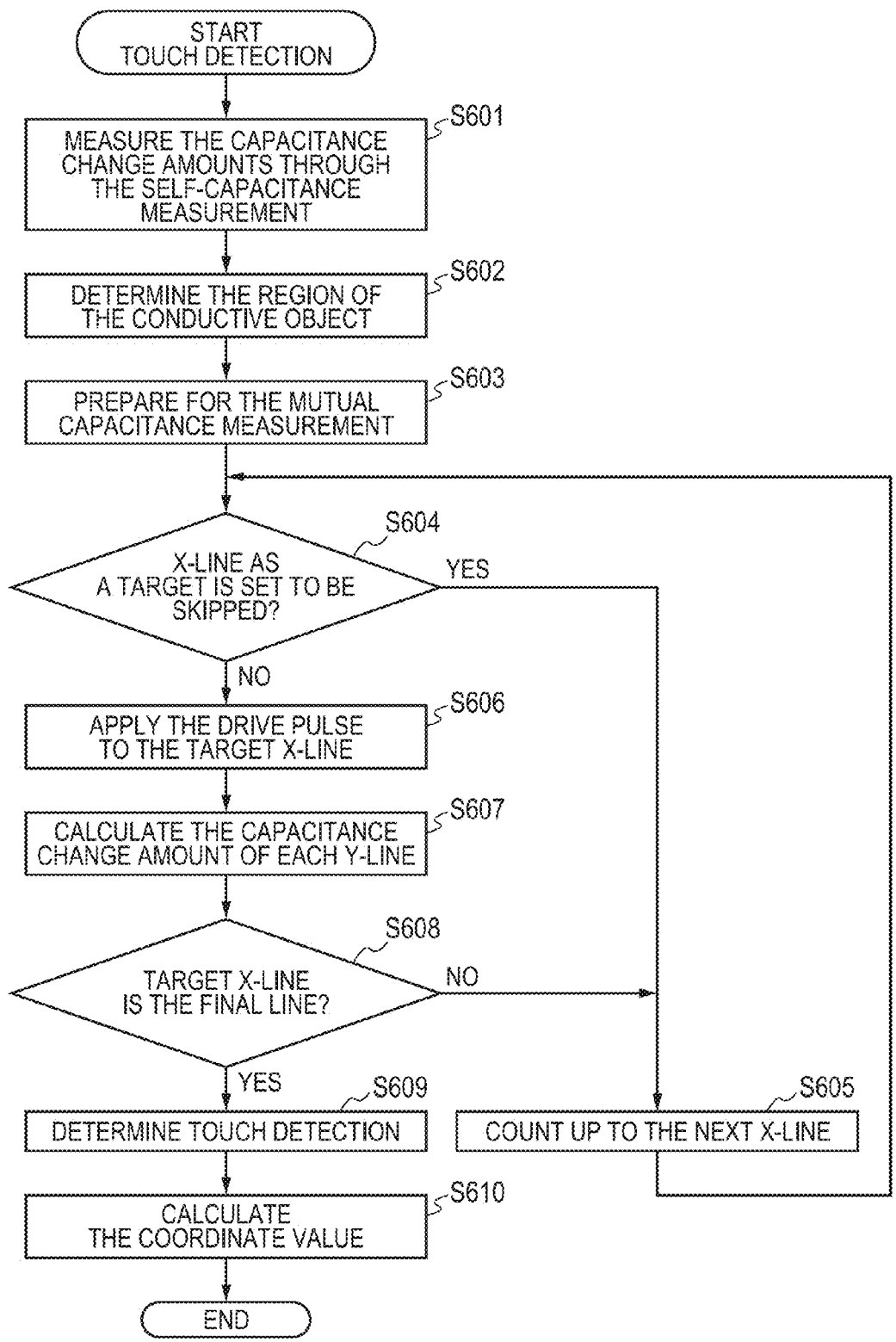
FIG. 6 is a flow chart for illustrating processing of the touch detection device.

Next, the above-mentioned processing of the touch detection device 100 is described with reference to the flow chart of FIG. 6. The flow chart of FIG. 6 is realized by causing the CPU 106 to load the program stored in the ROM 116 into the RAM 117 to execute the program.

In Step S601, the touch detection control portion 101 measures the capacitance change amounts of the row electrodes 102X and the column electrodes 102Y through the self-capacitance measurement. Specifically, the AD conversion portion 109 calculates the capacitance change amount for each of the electrodes X1 to X7 and each of the electrodes Y1 to Y11.

In Step S602, the conductor area determining portion 111 determines the region of the conductive object based on the capacitance change amounts. Specifically, the conductor area determining portion 111 compares the capacitance change amount of the row electrode 102X with the X-line conductor determination threshold, and compares the capacitance change amount of the column electrode 102Y with the Y-line conductor determination threshold, to thereby determine the electrodes corresponding to the region of the conductive object.

Next, the conductor area determining portion 111 sets skipping via the drive pulse control portion 107 so as to prevent application of the drive pulse to the electrodes at which the conductive object is absent among the row electrodes 102X (electrode X1 to electrode X7). Further, regarding the electrodes at which the conductive object is absent among the column electrodes 102Y (electrode Y1 to electrode Y11), the conductor area determining portion 111 sets the accumulating circuits of the capacitance measuring portion 104Y to OFF via the measurement control portion 108.

In Step S603, the touch detection control portion 101 prepares for the mutual capacitance measurement. Specifically, the drive pulse control portion 107 causes the drive pulse applying portion 103 to shift to an initial state. Further, the measurement control portion 108 sets the accumulating circuits of the capacitance measuring portion 104Y that are not set to OFF in Step S602 to ON, and resets the accumulating circuits that are set to ON.

Next, the drive pulse control portion 107 applies, via the drive pulse applying portion 103X, the drive pulse sequentially from the X-line corresponding to the electrode X1.

In Step S604, the drive pulse control portion 107 determines whether or not the X-line as a target of the application of the drive pulse is an X-line corresponding to the electrode set to be skipped. Specifically, the drive pulse control portion 107 determines whether or not the X-line corresponds to the electrode at which the absence of the conductive object is determined among the row electrodes 102X. When the X-line corresponds to the electrode set to be skipped, the processing proceeds to Step S605, and when the X-line corresponds to the electrode not set to be skipped, the processing proceeds to Step S606.

In Step S605, the drive pulse control portion 107 skips scanning of, that is, prevents application of the drive pulse to the target X-line by the drive pulse applying portion 103X, and counts up to the next X-line. Further, the measurement control portion 108 resets the accumulating circuits of the capacitance measuring portion 104Y that are set to ON. Subsequently, the processing returns to Step S604, and the drive pulse control portion 107 determines whether or not the counted-up X-line is the X-line corresponding to the electrode set to be skipped.

On the other hand, in Step S606, the drive pulse control portion 107 applies the drive pulse to the target X-line via the drive pulse applying portion 103X.

In Step S607, the AD conversion portion 109 calculates the capacitance change amount of each Y-line electrode via the accumulating circuit of the capacitance measuring portion 104Y, which is set to ON. Note that, the capacitance cannot be acquired from the accumulating circuit that is set to OFF, and hence the calculation of the capacitance change amount thereof is omitted.

In Step S608, the drive pulse control portion 107 determines whether or not the target X-line is the final line. When the target X-line is not the final line, the processing proceeds to Step S605, and when the target X-line is the final line, the processing proceeds to Step S609. In Step S605, the drive pulse control portion 107 counts up to the next X-line. Further, the measurement control portion 108 resets the accumulating circuits of the capacitance measuring portion 104Y that are set to ON, and the processing returns to Step S604.

On the other hand, in Step S609, the touch detecting portion 110 determines touch detection of the conductive object based on the capacitance change amounts of all of the electrodes. Specifically, the touch detecting portion 110 determines that touch has been detected when the capacitance change amount measured based on the mutual capacitance is equal to or more than a predetermined touch detection threshold.

In Step S610, the coordinate calculating portion 112 calculates the coordinate value of the touch detection through, for example, calculation of the center of gravity based on the capacitance change amounts of the near intersections. The communication portion 113 communicates, to the host microcomputer, whether or not the touch is detected, which is determined by the touch detecting portion 110, and the coordinate value of the touch detection, which is calculated by the coordinate calculating portion 112.

The touch detection device 100 repeats the processing from Step S601 to Step S610 at intervals of a predetermined time, that is, for each frame (one scanning frame), and notifies the host microcomputer of whether or not the touch is detected and the coordinate value of the touch detection of each frame. As described above, in this embodiment, first, the region of the conductive object is determined by the self-capacitance measurement, and in the mutual capacitance measurement, the drive pulse is not applied to the electrode at which the conductive object is absent to prevent capacitance measurement. In this manner, the power consumption can be reduced.

Note that, in Step S602, when none of the capacitance change amounts is calculated to be equal to or more than the touch detection threshold, all of the row electrodes 102X are set to be skipped to prevent application of the drive pulse, and all of the accumulating circuits of the capacitance measuring portion 104Y are set to OFF. Therefore, the capacitance change amount is not calculated, and hence it is determined in Step S609 that the touch is not detected.

Second Embodiment

In the self-capacitance measurement of the first embodiment, there is described a case where the conductor area determining portion 111 uses all of the row electrodes 102X and column electrodes 102Y to determine the region of the conductive object. In the self-capacitance measurement of this embodiment, the conductor area determining portion 111 determines the region of the conductive object with use of culled electrodes. That is, the division control portion 114 divides the row electrodes 102X and the column electrodes 102Y into a group of odd-numbered electrodes and a group of even-numbered electrodes, and the conductor area determining portion 111 determines the region of the conductive object based on the self-capacitance measurement of each divided group.

Specifically, the AD conversion portion 109 calculates, as the first frame, the capacitance change amounts through the self-capacitance measurement for the odd-line electrodes among the row electrodes 102X and the odd-line electrodes among the column electrodes 102Y. Next, the AD conversion portion 109 calculates, as the second frame, the capacitance change amounts through the self-capacitance measurement for the even-line electrodes among the row electrodes 102X and the even-line electrodes among the column electrodes 102Y.

Figure 7A:
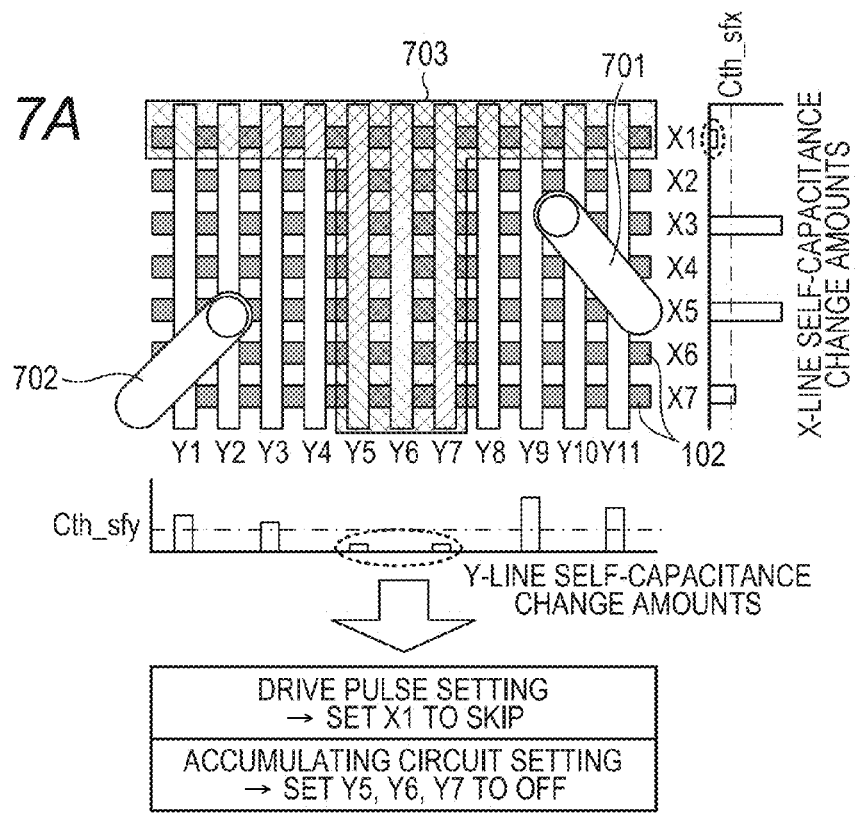
FIG. 7A and FIG. 7B are diagrams for illustrating processing of self-capacitance measurement according to a second embodiment of the present invention.
Figure 7B:
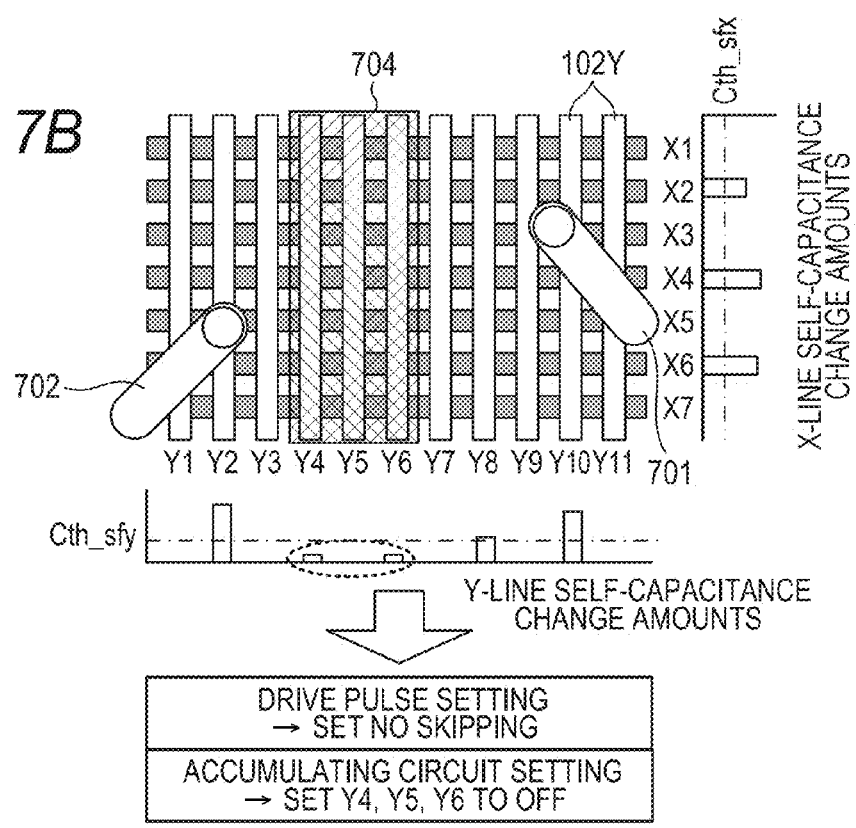

FIG. 7A and FIG. 7B are diagrams for illustrating processing of determining the region of the conductive object through the self-capacitance measurement.

In this case, two conductive objects 701 and 702 are present in the electrode portion 102. The conductive object 701 is present at the electrodes X2 to X5 among the row electrodes 102X and at the electrodes Y8 to Y11 among the column electrodes 102Y. Further, the conductive object 702 is present at the electrodes X5 to X7 among the row electrodes 102X and at the electrodes Y1 to Y3 among the column electrodes 102Y.

FIG. 7A is a diagram for illustrating a state of carrying out the self-capacitance measurement to the row electrodes 102X and the column electrodes 102Y in the first frame. In the first frame, the division control portion 114 controls the drive pulse control portion 107 and the measurement control portion 108, to thereby apply the drive pulse to only the odd-line electrodes and set the accumulating circuits of the capacitance measuring portion 104 corresponding to the even-line electrodes to OFF. Therefore, in the first frame, the AD conversion portion 109 calculates the capacitance change amounts of the electrode X1, the electrode X3, the electrode X5, and the electrode X7, which are odd-line electrodes among the row electrodes 102X. In FIG. 7A, the X-line self-capacitance change amounts are shown in a graph. Further, the AD conversion portion 109 calculates the capacitance change amounts of the electrode Y1, the electrode Y3, the electrode Y5, the electrode Y7, the electrode Y9, and the electrode Y11, which are odd-line electrodes among the column electrodes 102Y. In FIG. 7A, Y-line self-capacitance change amounts are shown in a graph.

The conductor area determining portion 111 compares the capacitance change amounts with the X-line conductor determination threshold, and compares the capacitance change amounts with the Y-line conductor determination threshold, to thereby determine the row and column electrodes 102X and 102Y at which the conductive objects are present. In this case, the conductor area determining portion 111 determines that the conductive objects are present at the electrode X3, the electrode X5, and the electrode X7 among the row electrodes 102X and at the electrode Y1, the electrode Y3, the electrode Y9, and the electrode Y11 among the column electrodes 102Y.

When the conductive object is not detected at continuous adjacent electrodes, such as at the electrode Y5 and the electrode Y7 among the column electrodes 102Y, the conductor area determining portion 111 notifies the measurement control portion 108 of the absence of the conductive object also at the electrode Y6 between the electrode Y5 and the electrode Y7. Therefore, the measurement control portion 108 sets the accumulating circuits of the capacitance measuring portion 104Y, which correspond to the electrodes Y5 to Y7 among the column electrodes 102Y notified as electrodes at which the conductive object is absent, to OFF.

On the other hand, regarding the row electrodes 102X, the conductor area determining portion 111 notifies the drive pulse control portion 107 of the absence of the conductive object at only the electrode X1. Therefore, the drive pulse control portion 107 sets skipping of preventing application of the drive pulse via the drive pulse applying portion 103X to only the X-line corresponding to the electrode X1.

Therefore, in the mutual capacitance measurement in the first frame, the capacitance change amount is not calculated for electrodes in a cross-hatched portion 703 illustrated in FIG. 7A.

FIG. 7B is a diagram for illustrating a state of carrying out the self-capacitance measurement to the row electrodes 102X and the column electrodes 102Y in the second frame. In the second frame, the division control portion 114 controls the drive pulse control portion 107 and the measurement control portion 108, to thereby apply the drive pulse to only the even-line electrodes and set the accumulating circuits of the capacitance measuring portion 104 corresponding to the odd-line electrodes to OFF. Therefore, in the second frame, the AD conversion portion 109 calculates the capacitance change amounts of the electrode X2, the electrode X4, and the electrode X6, which are even-line electrodes among the row electrodes 102X. In FIG. 7B, the X-line self-capacitance change amounts are shown in a graph. Further, the AD conversion selector portion 105Y calculates the capacitance change amounts of the electrode Y2, the electrode Y4, the electrode Y6, the electrode Y8, and the electrode Y10, which are even-line electrodes among the column electrodes 102Y. In FIG. 7B, Y-line self-capacitance change amounts are shown in a graph.

The conductor area determining portion 111 compares the capacitance change amounts with the X-line conductor determination threshold, and compares the capacitance change amounts with the Y-line conductor determination threshold, to thereby determine the row and column electrodes 102X and 102Y at which the conductive objects are present. In this case, the conductor area determining portion 111 determines that the conductive objects are present at the electrode X2, the electrode X4, and the electrode X6 among the row electrodes 102X and at the electrode Y2, the electrode Y8, and the electrode Y10 among the column electrodes 102Y.

When the conductive object is not detected at continuous adjacent electrodes, such as at the electrode Y4 and the electrode Y6 among the column electrodes 102Y, the conductor area determining portion 111 notifies the measurement control portion 108 of the absence of the conductive object also at the electrode Y5 between the electrode Y4 and the electrode Y6. Therefore, the measurement control portion 108 sets the accumulating circuits of the capacitance measuring portion 104Y, which correspond to the electrodes Y4 to Y6 among the column electrodes 102Y notified as electrodes at which the conductive object is absent, to OFF.

On the other hand, regarding the row electrodes 102X, there is no electrode at which the conductive object is not detected. Therefore, the conductor area determining portion 111 does not notify the drive pulse control portion 107 of the electrode to be set to skip the application of the drive pulse.

Therefore, in the mutual capacitance measurement in the second frame, the capacitance change amount is not calculated for electrodes in a cross-hatched portion 704 illustrated in FIG. 7B.

As described above, in this embodiment, the electrodes culled in the self-capacitance measurement are used to determine the region of the conductive object. In this manner, the power consumption can be further reduced. At this time, the plurality of electrodes are divided into two groups (odd-numbered electrodes and even-numbered electrodes), and the divided groups are alternately subjected to self-capacitance measurement for each frame. In this manner, the reduction in sensitivity for determining the region of the conductive object can be suppressed. Note that, the present invention is not limited to a case where the plurality of electrodes are divided into two groups, and the plurality of electrodes may be divided into three or more groups, and each divided group may be subjected to the self-capacitance measurement.

Third Embodiment

In the self-capacitance measurement of the first embodiment, there is described a case where the conductor area determining portion 111 uses all of the row electrodes 102X and column electrodes 102Y to determine the region of the conductive object. In the self-capacitance measurement of this embodiment, there is described a case where the conductor area determining portion 111 determines the region of the conductive object in the current frame based on the self-capacitance measurement of only the electrodes at which the absence of the conductive object is determined in the previous frame.

Figure 8:
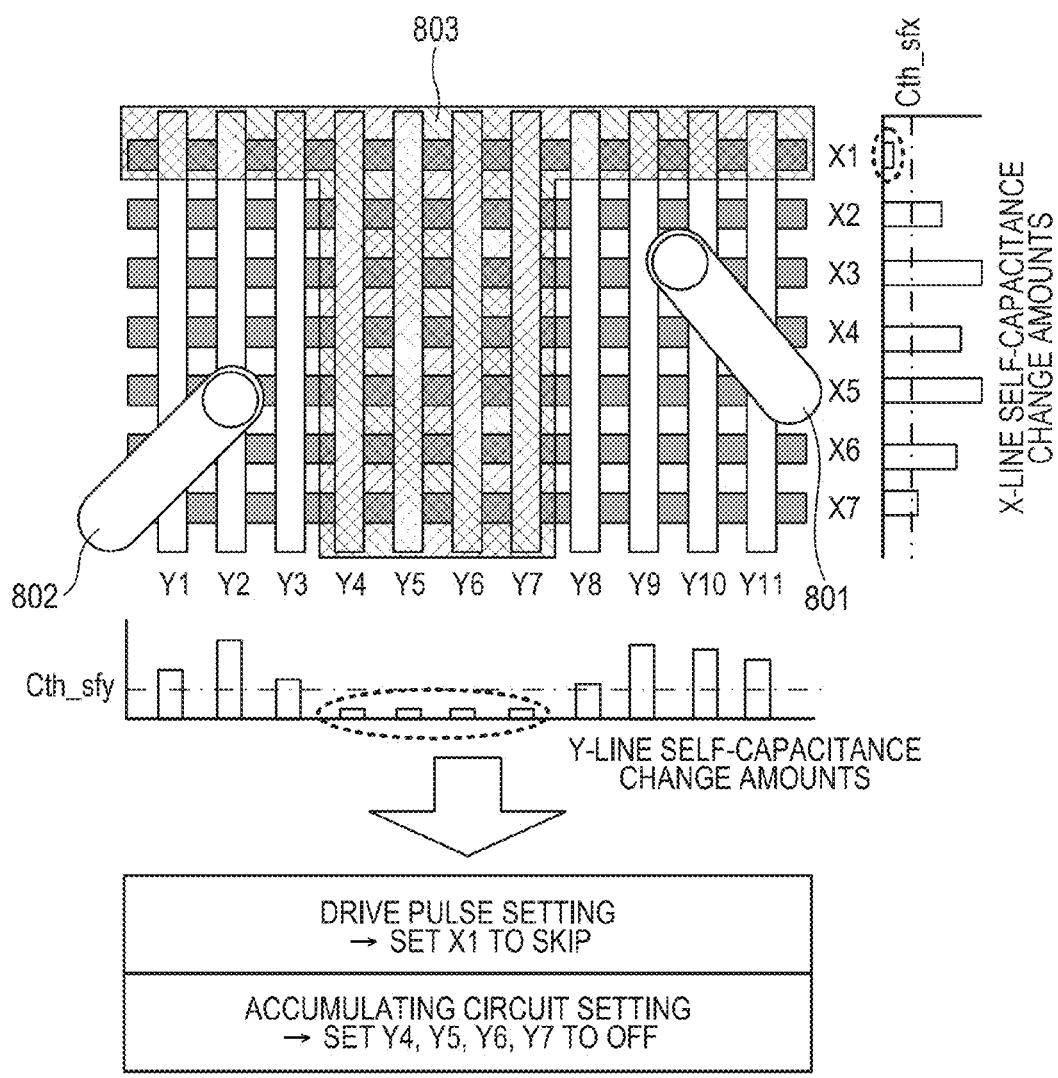
FIG. 8 is a diagram for illustrating a state of carrying out self-capacitance measurement in a first frame according to a third embodiment of the present invention.

FIG. 8 is a diagram for illustrating a state of carrying out the self-capacitance measurement to the row electrodes 102X and the column electrodes 102Y in the first frame. In FIG. 8, the capacitance change amounts calculated by the self-capacitance measurement are shown in graphs as X-line self-capacitance change amounts and Y-line self-capacitance change amounts. In this case, two conductive objects 801 and 802 are present in the electrode portion 102. The conductive object 801 is present at the electrodes X2 to X5 among the row electrodes 102X and at the electrodes Y8 to Y11 among the column electrodes 102Y. Further, the conductive object 802 is present at the electrodes X5 to X7 among the row electrodes 102X and at the electrodes Y1 to Y3 among the column electrodes 102Y.

In the frame illustrated in FIG. 8, the conductor area determining portion 111 determines that the conductive objects are present at the electrodes X2 to X7 among the row electrodes 102X and at the electrodes Y1 to Y3 and the electrodes Y8 to Y11 among the column electrodes 102Y. Therefore, the conductor area determining portion 111 sets skipping via the drive pulse control portion 107 so as to prevent application of the drive pulse to the electrode X1 at which the conductive object is absent. Further, the conductor area determining portion 111 sets, via the measurement control portion 108, the accumulating circuits of the capacitance measuring portion 104Y, which correspond to the electrodes Y4 to Y7 at which the conductive object is absent, to OFF. Therefore, in the mutual capacitance measurement, the capacitance change amount is not calculated for electrodes in a cross-hatched portion 803 illustrated in FIG. 8.

Figure 9:
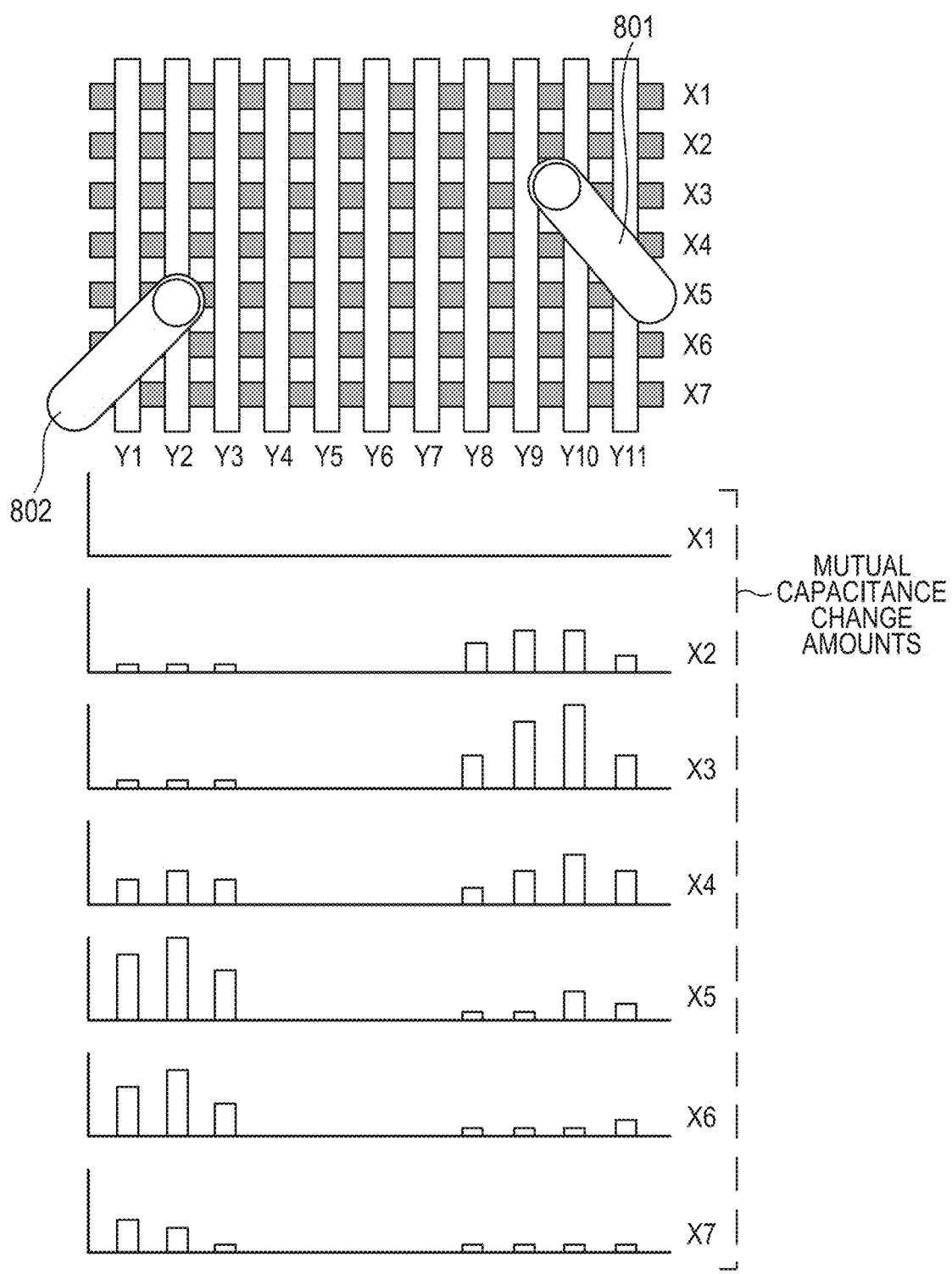
FIG. 9 is a diagram for illustrating a state of carrying out mutual capacitance measurement in the first frame according to the third embodiment.

FIG. 9 is a diagram for illustrating a state of carrying out the mutual capacitance measurement in the first frame.

In the mutual capacitance measurement, the capacitance measuring portion 104Y calculates the capacitance change amounts of only electrodes at which the presence of the conductive object is determined through the above-mentioned self-capacitance measurement, that is, the electrodes X2 to X7 among the row electrodes 102X and the electrodes Y1 to Y3 and the electrodes Y8 to Y11 among the column electrodes 102Y. In FIG. 9, the capacitance change amounts calculated by the mutual capacitance measurement are shown in graphs as mutual capacitance change amounts. The touch detecting portion 110 determines whether or not the touch is detected based on the calculated capacitance change amounts.

Next, in the second frame, the touch detection control portion 101 calculates the capacitance change amounts through the self-capacitance measurement using only the electrodes at which the conductive object is absent in the first frame among the row electrodes 102X and the column electrodes 102Y. Therefore, the conductor area determining portion 111 determines the region of the conductive object based on the self-capacitance measurement using only the electrodes at which the absence of the conductive object is determined by the conductor area determining portion 111 in the first frame.

Figure 10:
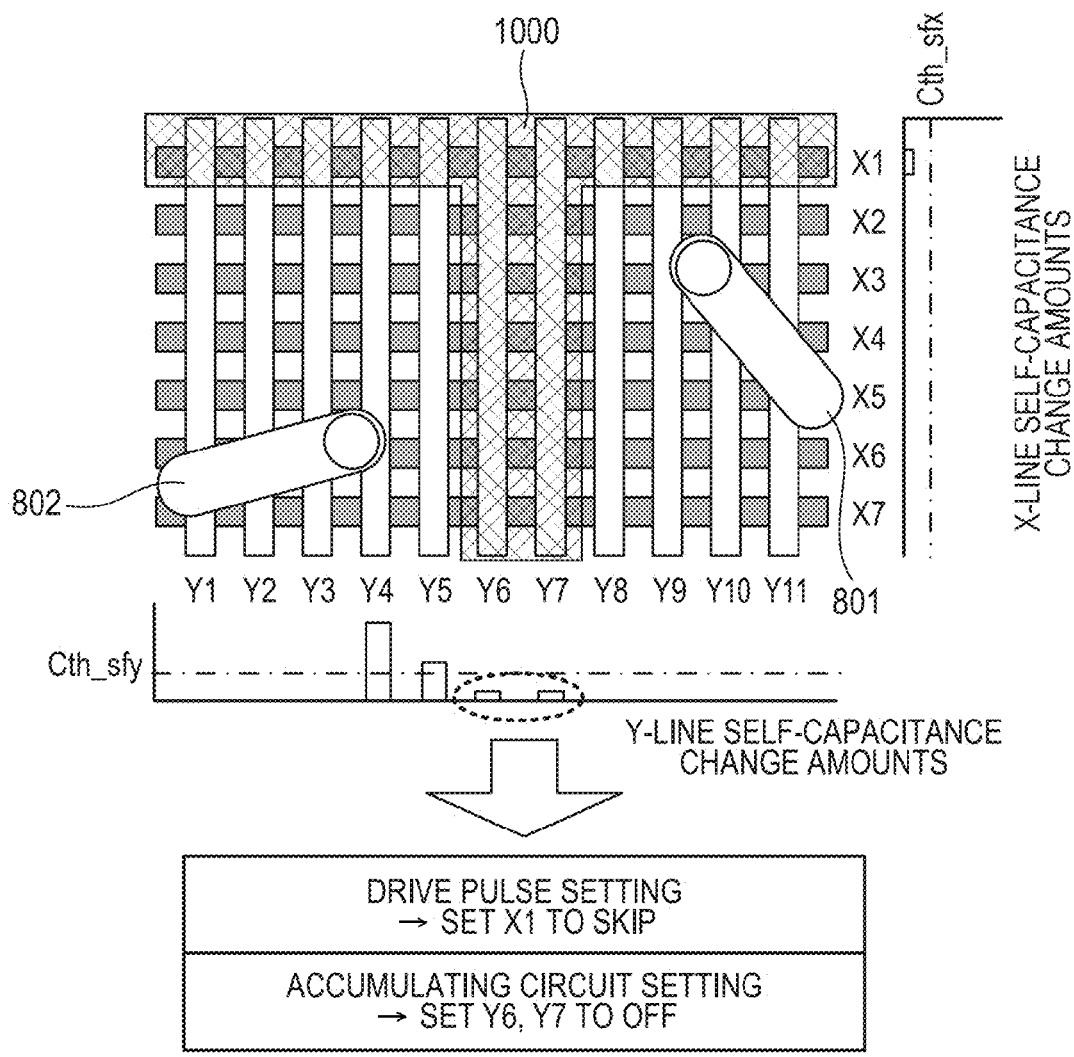
FIG. 10 is a diagram for illustrating a state of carrying out self-capacitance measurement in a second frame according to the third embodiment.

FIG. 10 is a diagram for illustrating a state of carrying out the self-capacitance measurement to the row electrodes 102X and the column electrodes 102Y in the second frame. In this case, the conductive object 801 is not moved, but the conductive object 802 is moved. The AD conversion portion 109 calculates the capacitance change amount of only the electrode X1 at which the absence of the conductive object is determined in the first frame. Further, the AD conversion portion 109 calculates the capacitance change amounts of only the electrodes Y4 to Y7 at which the absence of the conductive object is determined in the first frame. In FIG. 10, the capacitance change amounts calculated by the self-capacitance measurement are shown in graphs as X-line self-capacitance change amounts and Y-line self-capacitance change amounts.

Next, the conductor area determining portion 111 compares the capacitance change amount of the electrode X1 with the X-line conductor determination threshold, and compares the capacitance change amounts of the electrodes Y4 to Y7 with the Y-line conductor determination threshold. In this case, only the conductive object 802 is moved, and hence the capacitance change amounts of the electrodes Y4 and Y5 among the column electrodes 102Y are equal to or more than the Y-line conductor determination threshold. Therefore, the conductor area determining portion 111 determines that the conductive object is present at the electrodes Y4 and Y5. On the other hand, the capacitance change amount of the electrode X1 among the row electrodes 102X is less than the X-line conductor determination threshold, and hence, similarly to the first frame, the conductor area determining portion 111 determines that the conductive object is absent at the electrode X1.

Therefore, through the self-capacitance measurement in the second frame, the conductor area determining portion 111 sets, via the measurement control portion 108, the accumulating circuits of the capacitance measuring portion 104Y, which correspond to the electrodes Y6 and Y7 among the column electrodes 102Y at which the conductive object is absent, to OFF. Further, the drive pulse control portion 107 sets to skip the drive pulse application via the drive pulse applying portion 103X to the X-line corresponding to the electrode X1. Therefore, in the mutual capacitance measurement in the second scanning frame, the capacitance change amount is not calculated for electrodes in a cross-hatched portion 1000 illustrated in FIG. 10.

As described above, in this embodiment, the region of the conductive object in the current frame is determined based on the self-capacitance measurement of only the electrodes at which the absence of the conductive object is determined in the previous frame. In this manner, the power consumption can be further reduced.

Fourth Embodiment

In the self-capacitance measurement of the first embodiment, there is described a case where the conductor area determining portion 111 determines the region of the conductive object based on the self-capacitance measurement of each frame. In this embodiment, the movement of the conductive object is determined based on the difference amount of the self-capacitance measurement between the current frame and the previous frame. Further, there is described a case where, in the current frame, the mutual capacitance measurement is carried out based on the region of the conductive object acquired based on the mutual capacitance measurement in the previous frame.

Figure 11:
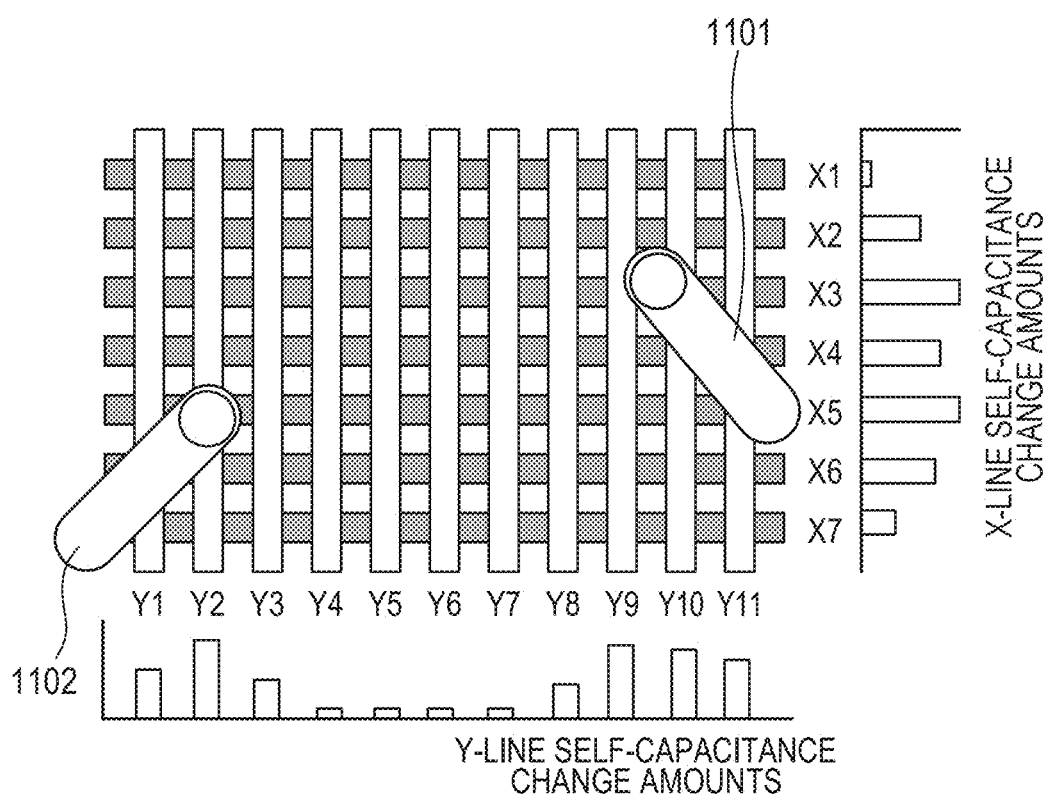
FIG. 11 is a diagram for illustrating a state of carrying out self-capacitance measurement in a first frame according to a fourth embodiment of the present invention.

FIG. 11 is a diagram for illustrating a state of carrying out the self-capacitance measurement to the row electrodes 102X and the column electrodes 102Y in the first frame. In this case, two conductive objects 1101 and 1102 are present in the electrode portion 102. The conductive object 1101 is present at the electrodes X2 to X5 among the row electrodes 102X and at the electrodes Y8 to Y11 among the column electrodes 102Y. The conductive object 1102 is present at the electrodes X5 to X7 among the row electrodes 102X and at the electrodes Y1 to Y3 among the column electrodes 102Y.

In the first frame, the conductor area determining portion 111 acquires the capacitance change amount of each row electrode 102X and each column electrode 102Y via the AD conversion portion 109, and stores the capacitance change amount into the RAM 117 or the like in association with each electrode. In FIG. 11, the capacitance change amounts calculated by the self-capacitance measurement are shown in graphs as X-line self-capacitance change amounts and Y-line self-capacitance change amounts.

Figure 12:
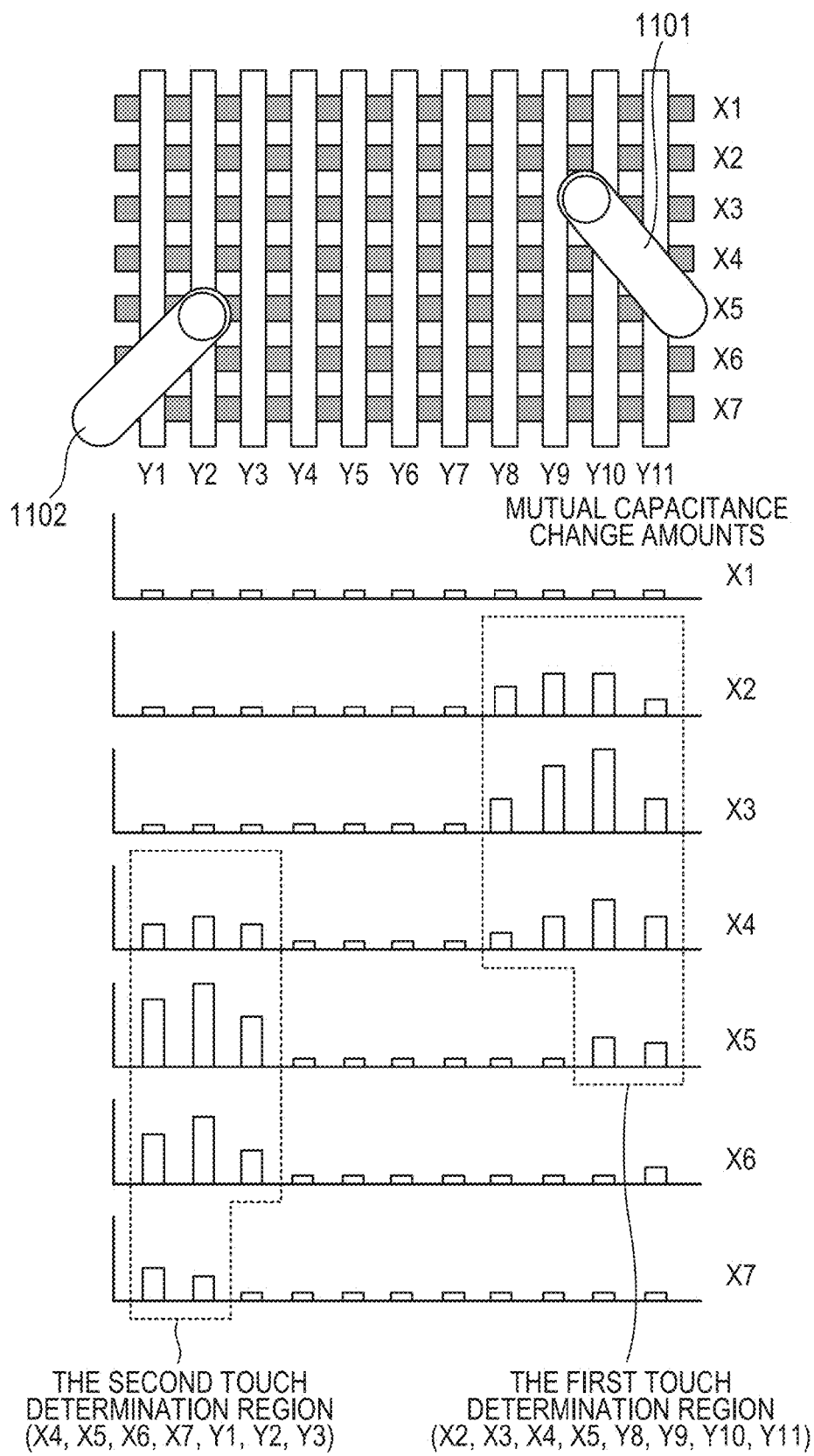
FIG. 12 is a diagram for illustrating a state of carrying out mutual capacitance measurement in the first frame according to the fourth embodiment.

FIG. 12 is a diagram for illustrating a state of carrying out the mutual capacitance measurement in the first frame. The AD conversion portion 109 calculates the capacitance change amount of each Y-line electrode via the accumulating circuit of the capacitance measuring portion 104Y. In FIG. 12, the capacitance change amounts calculated by the mutual capacitance measurement are shown in graphs as mutual capacitance change amounts. The touch detecting portion 110 determines that the touch has been detected when there is a capacitance change amount that is equal to or more than the touch detection threshold. Next, the touch detecting portion 110 sets a conductive-object touch determination region. This region is, for example, also a region for the coordinate calculating portion 112 to calculate the center of gravity.

In this case, the touch detecting portion 110 sets the electrodes corresponding to the region of the conductive object 1101, that is, the electrode X2, the electrode X3, the electrode X4, the electrode X5, the electrode Y8, the electrode Y9, the electrode Y10, and the electrode Y11 as a first touch determination region. Further, the touch detecting portion 110 sets the electrodes corresponding to the region of the conductive object 1102, that is, the electrode X4, the electrode X5, the electrode X6, the electrode X7, the electrode Y1, the electrode Y2, and the electrode Y3 as a second touch determination region. In FIG. 12, the first touch determination region and the second touch determination region are shown by the broken lines in the graphs of the mutual capacitance change amounts.

Figure 13:
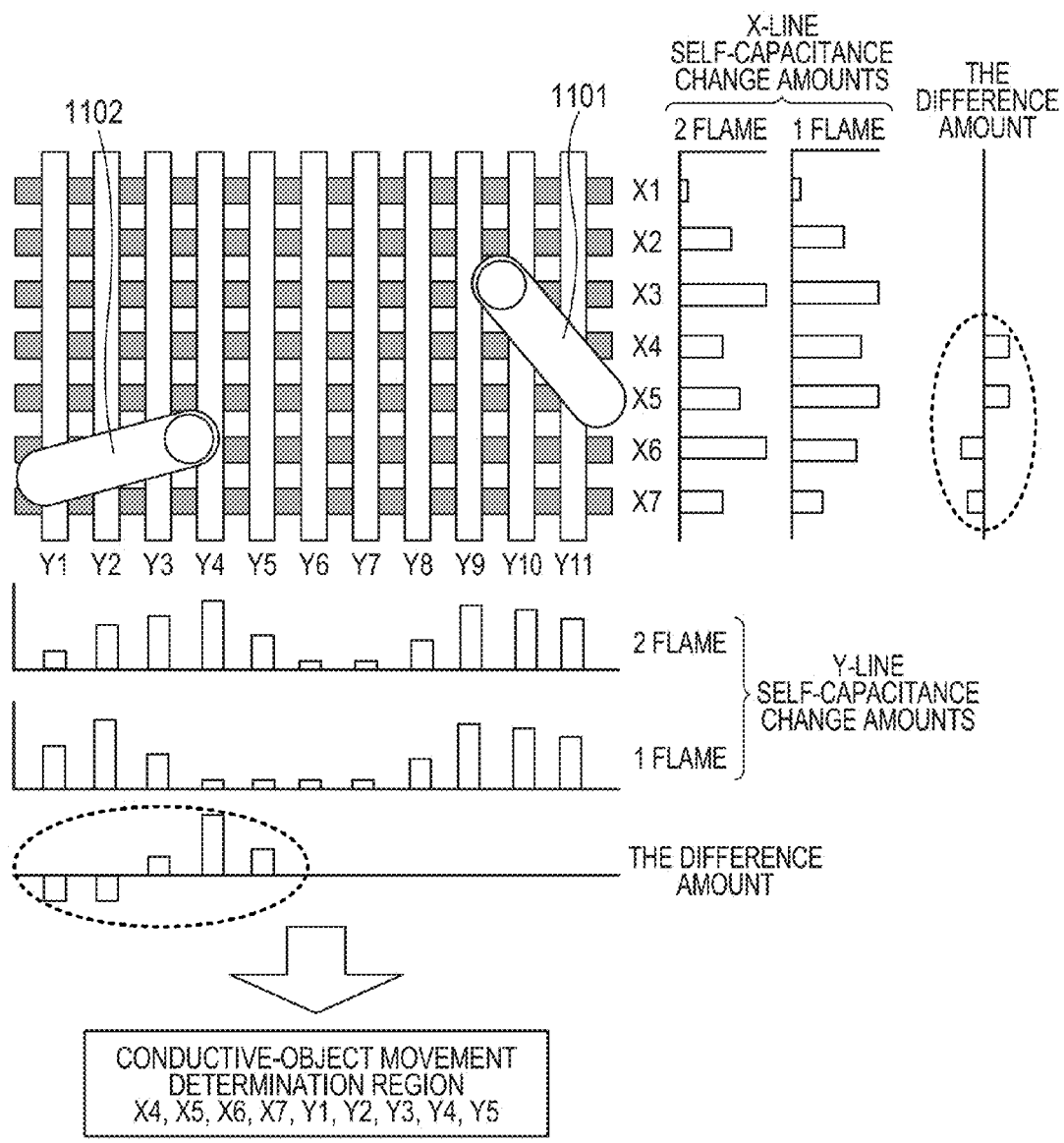
FIG. 13 is a diagram for illustrating a state of carrying out self-capacitance measurement in a second frame according to the fourth embodiment.

FIG. 13 is a diagram for illustrating a state of carrying out the self-capacitance measurement in the second frame. In this case, only the conductive object 1102 is moved.

In the second frame, the conductor area determining portion 111 acquires the capacitance change amount of each row electrode 102X and each column electrode 102Y via the AD conversion portion 109, and stores the capacitance change amount into the RAM 117 or the like in association with each electrode.

Next, the conductive-object movement determining portion 115 calculates the difference amount between the capacitance change amount of each electrode stored in the first frame and the capacitance change amount of each electrode stored in the second frame. The conductive-object movement determining portion 115 determines the electrode that has a difference amount equal to or more than a predetermined amount. In FIG. 13, the difference amount of a predetermined amount or more is shown by the broken lines in the graphs. In this case, the conductive object 1102 is moved, and hence the difference amount of the capacitance change amount is equal to or more than the predetermined amount at the electrodes Y1 to Y5 among the column electrodes 102Y and at the electrodes X4 to X7 among the row electrodes 102X.

The conductive-object movement determining portion 115 determines that the conductive object has been moved when the difference amount is equal to or more than the predetermined amount, and acquires, separately from the touch determination region, a conductive-object movement determination region (electrode X4, electrode X5, electrode X6, electrode X7, electrode Y1, electrode Y2, electrode Y3, electrode Y4, and electrode Y5).

FIG. 14A and FIG. 14B are diagrams for illustrating electrodes whose capacitance change amounts are acquired by the mutual capacitance measurement in the second frame.

The conductive-object movement determining portion 115 is set to calculate the capacitance change amounts of a region obtained by adding the conductive-object movement determination region where the conductive object may be present to the first touch determination region and the second touch determination region. The conductive-object movement determining portion 115 uses a table, to thereby set the electrode whose capacitance change amount is acquired in the mutual capacitance measurement in the second frame to ON and set the electrode whose capacitance change amount is not acquired to OFF.

As illustrated in FIG. 14A, the first touch determination region (electrode X2, electrode X3, electrode X4, electrode X5, electrode Y8, electrode Y9, electrode Y10, and electrode Y11) determined by the mutual capacitance measurement in the first frame is set to ON. Further, the second touch determination region (electrode X4, electrode X5, electrode X6, electrode X7, electrode Y1, electrode Y2, and electrode Y3) is set to ON. Further, the conductive-object movement determination region (electrode X4, electrode X5, electrode X6, electrode X7, electrode Y1, electrode Y2, electrode Y3, electrode Y4, and electrode Y5) determined based on the difference amount of the self-capacitance measurement in the second frame is set to ON. The conductive-object movement determining portion 115 stores, in the RAM 117 or the like, a table for setting ON/OFF shown in FIG. 14A.

The drive pulse control portion 107 applies, via the drive pulse applying portion 103X, the drive pulse sequentially from the X-line corresponding to the electrode X1. The AD conversion portion 109 calculates the capacitance change amount of each Y-line electrode via the accumulating circuit of the capacitance measuring portion 104Y, which is set to ON.

In this case, in the X-line corresponding to the electrode X1, all of the accumulating circuits of the capacitance measuring portion 104Y corresponding to the electrodes Y1 to Y11 among the column electrodes 102Y are set to OFF, and hence the AD conversion portion 109 does not calculate the capacitance change amount.

Next, in the X-line corresponding to the electrode X2, only the accumulating circuits of the capacitance measuring portion 104Y corresponding to the electrodes Y8 to Y11 among the column electrodes 102Y are set to ON, and hence the AD conversion portion 109 calculates the capacitance change amounts of only the electrodes Y8 to Y11.

Subsequently, the drive pulse is sequentially applied to the row electrodes 102X, and the AD conversion portion 109 calculates the capacitance change amount based on the table for setting ON/OFF of the accumulating circuit.

Therefore, in the mutual capacitance measurement in the second frame, the capacitance change amount is not calculated for electrodes in a cross-hatched portion 1401 illustrated in FIG. 14B.

As described above, in this embodiment, the movement of the conductive object is determined based on the difference amount of the self-capacitance measurement between the current frame and the previous frame. In this manner, the movement of the conductive object can be accurately determined. Further, the region of the conductive object in the previous frame is acquired based on the mutual capacitance measurement, and thus the capacitances of only electrodes in a region approximated to the shape of the conductive object can be measured. Therefore, the power consumption can be further reduced.

The present invention has been described above in detail based on the exemplary embodiments thereof, but the present invention is not limited to those particular embodiments, and the present invention encompasses various modes without departing from the gist of the present invention. Further, the above-mentioned embodiments are each merely one embodiment of the present invention, and the respective embodiments can be combined as appropriate.

For example, there is described a case where the electrode portion 102 of the above-mentioned embodiments includes the column electrodes 102Y that are the electrodes Y1 to Y11 and the row electrodes 102X that are the electrodes X1 to X7, but the present invention is not limited to this case. When a large-sized touch panel is employed, the number of the column electrodes 102Y and the row electrodes 102X is increased, and the capacitance value to be generated is increased as well. Therefore, the number of electrodes at which the conductive object is absent is increased as the touch panel is increased in size. Therefore, as described above, when the drive pulse is not applied to the electrodes at which the conductive object is absent to prevent capacitance measurement, the power consumption can be further reduced.

Further, there is described a case where the electrode portion 102 of the above-mentioned embodiments is a so-called square electrode, but the present invention is not limited thereto. Even when the electrode portion 102 is a diamond-shaped electrode or a star-shaped electrode, the power consumption can be similarly reduced.

Further, there is described a case where, in the mutual capacitance measurement of the above-mentioned embodiments, the drive pulse is applied to the row electrode 102X, and the capacitance of the column electrode 102Y is measured, but the present invention is not limited thereto. The drive pulse may be applied to the column electrode 102Y, and the capacitance of the row electrode 102X may be measured.

Further, in the above-mentioned embodiments, there is described a case where the CPU 106 controls a plurality of pieces of hardware, and the plurality of pieces of hardware share the processing, to thereby realize the processing of the touch detection device 100, but the present invention is not limited to this case. For example, all or some of the plurality of pieces of hardware to be controlled by the CPU 106 may be omitted, and the CPU 106 itself may execute the processing, to thereby realize the processing of the touch detection device 100.

Further, the touch detection device 100 of the above-mentioned embodiments can be used for an electronic device including a touch panel. Examples of the electronic device including the touch panel, which are applicable to the present invention, include a personal computer, a PDA, a mobile phone terminal, a portable image viewer, a printing device including a display, a digital photo frame, a music player, a game machine, and an electronic book reader.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-228317, filed Nov. 10, 2014, which is hereby incorporated by reference herein in its entirety.

What is claimed is:

1. An electronic device, comprising:
a determining unit configured to determine, in a Nth frame, a region of a conductive object based on measurement of a self-capacitance of each of a plurality of electrodes arranged to intersect with each other;
a detecting unit configured to detect, in the Nth frame, the conductive object based on measurement of a mutual capacitance of, among the plurality of electrodes, an electrode corresponding to the region of the conductive object determined by the determining unit, without measuring, in the Nth frame, a mutual capacitance of an electrode outside of the region of the conductive object determined by the determining unit; and
a control unit configured to control measurement of the self-capacitance, so as not to measure the self-capacitance in a N+1th frame of an electrode of the region of the conductive object detected in the Nth frame by the detecting unit, but so as to measure the self-capacitance in the N+1th frame of an electrode of a region not determined in the Nth frame by the determining unit to be a region of the conductive object,
wherein, the determining unit further determines, in the N+1th frame, a region of a conductive object based on measurement of the self-capacitance in the N+1th frame of each of the plurality of electrodes based on the control by the control unit, and
the detecting unit detects, in the N+1th frame, the conductive object based on measurement of a mutual capacitance in the N+1th frame of an electrode corresponding to the region of the conductive object determined in the N+1th frame by the determining unit.

2. An electronic device according to claim 1, further comprising an applying unit configured to apply a drive pulse to the plurality of electrodes,
wherein the applying unit is configured to apply the drive pulse to the electrode corresponding to the region of the conductive object determined by the determining unit, without applying the drive pulse to the electrode outside of the region of the conductive object determined by the determining unit.

3. An electronic device according to claim 1, further comprising an accumulating unit configured to accumulate capacitances of the plurality of electrodes,
wherein the accumulating unit is configured to accumulate a capacitance of the electrode corresponding to the region of the conductive object determined by the determining unit, without accumulating a capacitance of the electrode outside of the region of the conductive object determined by the determining unit.

4. An electronic device according to claim 1, wherein the determining unit is configured to determine the region of the conductive object based on the measurement of the self-capacitance of an electrode culled from the plurality of electrodes.

5. An electronic device according to claim 4, further comprising a dividing unit configured to divide the plurality of electrodes into two or more groups,
wherein the determining unit is configured to determine the region of the conductive object based on the measurement of the self-capacitance of each group divided by the dividing unit.

6. An electronic device according to claim 5,
wherein the dividing unit is configured to divide the plurality of electrodes into a group of odd-numbered electrodes and a group of even-numbered electrodes, and
wherein the determining unit is configured to determine the region of the conductive object based on the measurement of the self-capacitance alternately in the group of odd-numbered electrodes and the group of even-numbered electrodes for each frame.

7. An electronic device according to claim 1, further comprising a movement determining unit configured to determine movement of the conductive object based on a difference amount of the measurement of the self-capacitance between a the Nth frame and a frame N−1th frame,
wherein the detecting unit is configured to detect the conductive object based on the measurement of the mutual capacitance of an electrode corresponding to a region to which the conductive object is moved, which is determined by the movement determining unit, in addition to the electrode corresponding to the region of the conductive object determined in the N−1th frame.

8. An electronic device according to claim 7, further comprising an acquiring unit configured to acquire the region of the conductive object in the N−1th frame based on the measurement of the mutual capacitance.

9. An electronic device according to claim 1, wherein the detecting unit is configured to detect a position of the conductive object.

10. A method of controlling an electronic device, comprising:
determining, in a Nth frame, a region of a conductive object based on measurement of a self-capacitance of each of a plurality of electrodes arranged to intersect with each other;
detecting, in the Nth frame, the conductive object based on measurement of a mutual capacitance of, among the plurality of electrodes, an electrode corresponding to the region of the conductive object determined in the determining a region, without measuring, in the Nth frame, a mutual capacitance of an electrode outside of the region of the conductive object determined in the determining; and
controlling measurement of the self-capacitance, so as not to measure the self-capacitance in a N+1th frame of an electrode of the region of the conductive object detected in the Nth frame by the detecting, but so as to measure the self-capacitance in the N+1th frame of an electrode of a region not determined in the Nth frame by the determining to be a region of the conductive object,
wherein, the determining further determines, in the N+1th frame, a region of a conductive object based on measurement of the self-capacitance in the N+1th frame of each of the plurality of electrodes based on the control by the controlling, and
the detecting further detects, in the N+1th frame, the conductive object based on measurement of a mutual capacitance in the N+1th frame of an electrode corresponding to the region of the conductive object determined in the N+1th frame by the determining.

11. A non-transitory computer-readable medium having recorded thereon a program that, when executed by processor of a computer, causes the computer to execute:

determining, in a Nth frame, a region of a conductive object based on measurement of a self-capacitance of each of a plurality of electrodes arranged to intersect with each other;

detecting unit, in the Nth frame, the conductive object based on measurement of a mutual capacitance of, among the plurality of electrodes, an electrode corresponding to the region of the conductive object determined by the determining, without measuring, in the Nth frame, a mutual capacitance of an electrode outside of the region of the conductive object determined by the determining; and controlling measurement of the self-capacitance, so as not to measure the self-capacitance in a N+1th frame of an electrode of the region of the conductive object detected in the Nth frame by the detecting, but so as to measure the self-capacitance in the N+1th frame of an electrode of a region not determined in the Nth frame by the determining to be a region of the conductive object, wherein, the determining further determines, in the N+1th frame, a region of a conductive object based on measurement of the self-capacitance in the N+1th frame of each of the plurality of electrodes based on the control by the controlling, and the detecting further detects, in the N+1th frame, the conductive object based on measurement of a mutual capacitance in the N+1th frame of an electrode corresponding to the region of the conductive object determined in the N+1th frame by the determining.

* * * * *